(12) United States Patent
McGuire et al.

(10) Patent No.: US 8,968,577 B2
(45) Date of Patent: Mar. 3, 2015

(54) PROCESS FOR TREATING FLUIDS

(75) Inventors: Dennis McGuire, Stuart, FL (US);
Sanjeev Jakhete, Stuart, FL (US)

(73) Assignee: Ecosphere Technologies, Inc., Stuart, FL (US)

( * ) Notice: Subject to any disclaimer, the term of this patent is extended or adjusted under 35 U.S.C. 154(b) by 278 days.

(21) Appl. No.: 13/493,634

(22) Filed: Jun. 11, 2012

(65) Prior Publication Data

US 2013/0327720 A1 Dec. 12, 2013

(51) Int. Cl.

| | | |
|---|---|---|
| *C02F 1/78* | (2006.01) | |
| *C02F 1/36* | (2006.01) | |
| *C02F 1/52* | (2006.01) | |
| *C02F 1/48* | (2006.01) | |
| *C02F 5/02* | (2006.01) | |
| *C02F 1/461* | (2006.01) | |
| *C02F 1/463* | (2006.01) | |
| *C02F 103/36* | (2006.01) | |

(52) U.S. Cl.
CPC ... *C02F 1/36* (2013.01); *C02F 1/52* (2013.01); *C02F 2001/46171* (2013.01); *C02F 1/78* (2013.01); *C02F 2201/008* (2013.01); *C02F 1/463* (2013.01); *C02F 1/48* (2013.01); *C02F 2001/46152* (2013.01); *C02F 2303/04* (2013.01); *C02F 2303/22* (2013.01); *C02F 2103/365* (2013.01); *C02F 5/02* (2013.01)
USPC ............. 210/748.03; 210/748.01; 210/177; 210/190; 36/660; 422/20; 422/22; 422/127; 422/186

(58) Field of Classification Search
CPC ................ C02F 9/04; C02F 1/78; C02F 1/68; C02F 1/44
USPC ............ 210/748.01, 636, 638, 660, 205, 177, 210/190, 721, 665, 702, 748.02, 749, 764, 210/243, 198.1; 166/90.1, 267; 422/20, 22, 422/127, 128, 186; 204/155, 157.15, 204/157.42, 157.62, 164, 450, 513, 514, 204/551, 553, 554, 560, 193, 194
See application file for complete search history.

(56) References Cited

U.S. PATENT DOCUMENTS

| | | | |
|---|---|---|---|
| 2004/0232086 A1* | 11/2004 | Bettmann et al. | 210/748 |
| 2007/0125719 A1* | 6/2007 | Yarbrough et al. | 210/748 |
| 2008/0093284 A1* | 4/2008 | Slough et al. | 210/205 |
| 2010/0072143 A1* | 3/2010 | Jacobs et al. | 210/748.19 |

* cited by examiner

*Primary Examiner* — Walter D Griffin
*Assistant Examiner* — Cameron J Allen
(74) *Attorney, Agent, or Firm* — McHale & Slavin, P.A.

(57) ABSTRACT

Disclosed is an improved water treatment process that operates on a continuous flow of fluids that are subjected to hydrodynamic waves, acoustic ultrasonic waves in combination with injected ozone and electro chemical treatment. The treatment system provides a cost efficient and environmentally friendly process and apparatus for cleaning and recycling fluids as contaminated as frac water, used to stimulate gas production from shale formations, as well as other types of fluids having various levels of contaminants such as aerobic and anaerobic bacteria and suspended solids. The calcium carbonate scaling tendency is reduced to an acceptable level without the use of acids, ion exchange materials, or anti scaling chemicals which is of economical and environmental significance and benefit.

21 Claims, 46 Drawing Sheets

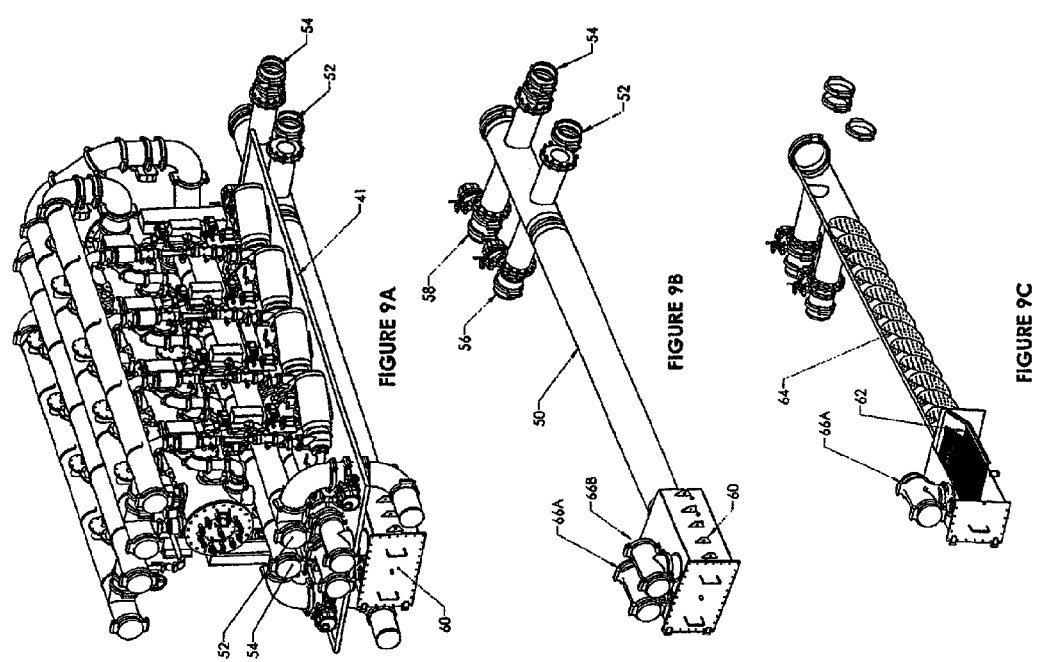

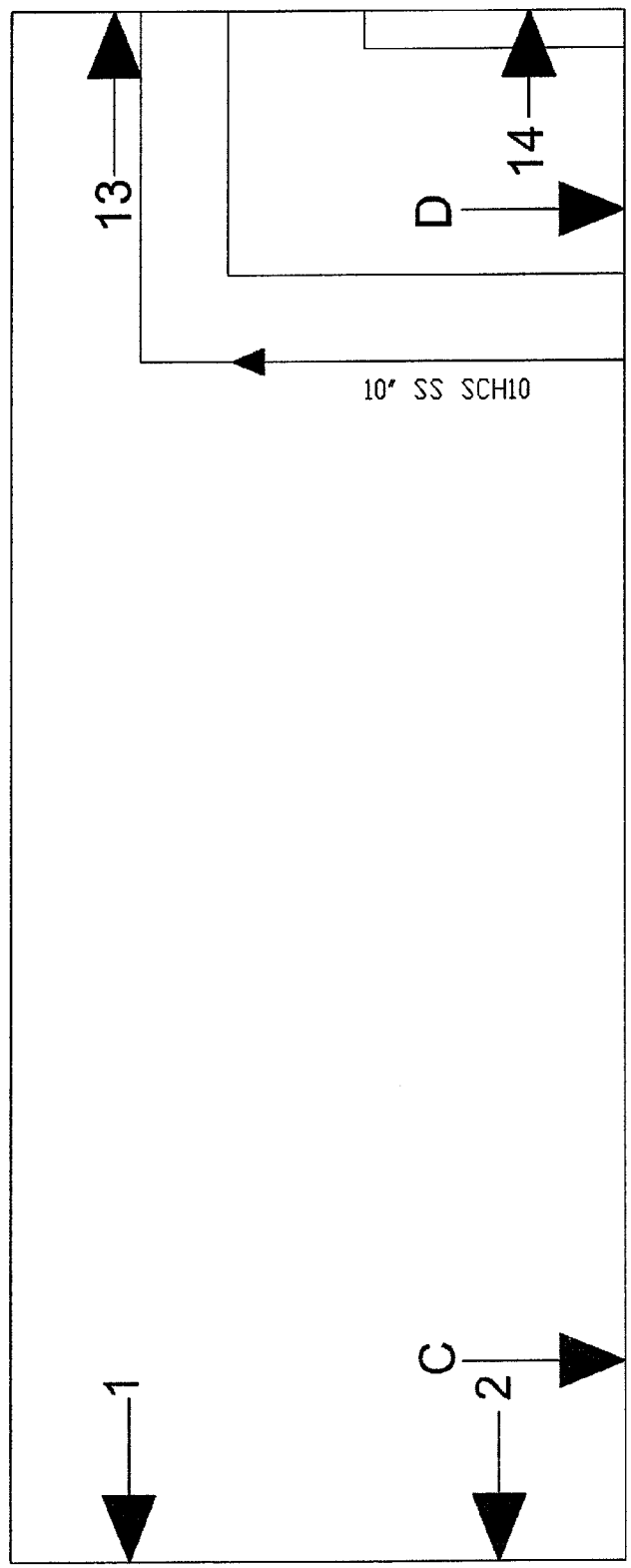

PROCESS FOR TREATING FLUIDS

CROSS-REFERENCE TO RELATED APPLICATIONS

This application is related to U.S. patent application Ser. No. 13/450,172, entitled "Apparatus for Treating Fluids", filed on Apr. 18, 2012. In addition, this application is a continuation-in-part U.S. patent application Ser. No. 13/019,113, entitled "Transportable Reactor Tank", filed Feb. 1, 2011, which is a continuation-in-part of U.S. patent application Ser. No. 12/765,971, entitled "Improved Reactor Tank", filed Apr. 23, 2010, which is a continuation-in-part of U.S. patent application Ser. No. 12/399,481, entitled "Enhanced Water Treatment for Reclamation of Waste Fluids and Increased Efficiency Treatment of Portable Waters", filed Mar. 6, 2009, now U.S. Pat. No. 7,699,988, issued Apr. 20, 2010, which is a continuation-in-part of U.S. patent application Ser. No. 12/184,716, entitled "Enhanced Water Treatment for Reclamation of Waste Fluids and Increased Efficiency Treatment of Portable Waters", filed Aug. 1, 2008, now U.S. Pat. No. 7,699,994, issued Apr. 20, 2010, which in turn is a continuation-in-part of U.S. Provisional Patent Application No. 60/953,584, entitled "Enhanced Water Treatment for Reclamation of Waste Fluids and Increased Efficiency Treatment of Portable Water", filed Aug. 2, 2007, the contents of which are hereby expressly incorporated by reference.

FIELD OF THE INVENTION

This invention related to the field of fluid treatment and, in particular, to an improved treatment apparatus for destroying aerobic and anaerobic bacteria in fluids used in oil and gas recovery and conditioning of said fluid for reuse.

BACKGROUND OF THE INVENTION

The Applicant has worked extensively with some of the foulest waters imaginable. In many such instances the treatment of such fluids can be extremely expensive. For example, the global direct costs to oil companies for treating water used in oil and gas recovery surpassed $20 billion in 2007, with expenses skyrocketing in the following years.

While the instant invention can be used on most any fluid that is contaminated, it is especially suited for water contaminated with aerobic or anaerobic bacteria, or waters that benefit from the reduction in dissolved or suspended solids or conditioning thereof. Aerobic bacteria, often called a slime forming bacteria, produces a polysaccharide bio-film that often adheres to the shale and inhibits the flow of gasses. Anaerobic bacteria can be include an acid producing bacteria such as APB that grows on metal and secretes acid producing corrosion, or SRB which is a sulfate reducing bacteria that produces hydrogen sulfide and has the potential to create a dangerous situation and literally shut down a well.

The produced water example will highlight a major problem with contaminated water, produced waters are the byproduct associated with oil and gas production and contain both natural and manmade contaminants. The US Department of Energy (DOE) has called produced water "by far the largest single volume byproduct or waste stream associated with oil and gas production." The DOE further terms its treatment a serious environmental concern and a significantly growing expense to oil and gas producers. While the instant cavitation reactor has a beneficial use with most any water treatment problem, the produced water problem highlights the effectiveness of the system.

In 2007, the world's oil and gas fields produced 80 billion barrels of water needing processing. The average is now almost nine barrels of produced water for each barrel of oil extracted. And the ratio of water to hydrocarbons increases over time as wells become older. That means less oil or gas and more contaminated water as we attempt to meet rising global energy needs.

The discharge of produced water is unacceptable unless treated. Currently it is necessary to introduce chemical polymers to flocculate the slurry and further treat the volatile organic compounds (VOC's) that are emitted as gases from certain solids or liquids. The VOC's are known to include a variety of chemicals some of which may have short or long term adverse health effects and is considered an unacceptable environmental discharge contaminant. Unfortunately, the use of polymers and a settling time is so expensive that economically it becomes more conducive to treat the waste off-site that further adds to the cost of production by requiring off-site transport/treatment or shipped to a hazardous waste facility where no treatment is performed.

The applicants have developed an enhanced water treatment system that employs the use of a cavitation reactor. The instant invention advances the developed processes of oxidizing heavy metals, converting oil sheens to inert $CO^2$ and water, precipitating certain cations or conditioning thereof, and oxidizing organics at a well site. Further, the system may treat numerous other fluid related problems providing both an economic and environmental benefit.

There are many gas fields, most notably in North America, that contain enormous amounts of natural gas. This gas is trapped in shale formations that require stimulating the well using a process known as fracturing or fracing. The fracing process uses large amounts of water and large amounts of particulate fracing material (frac sands) to enable extraction of the gas from the shale formations. After the well site has been stimulated, the water pumped into the well during the fracing process is removed, and is referred to as flowback fluid or frac water.

Water is an important natural resource that needs to be conserved wherever possible. One way to conserve water is to clean and recycle this flowback or frac water. The recycling of frac water has the added benefit of reducing waste product, namely the flowback fluid, which will need to be properly disposed. On site processing equipment, at the well, is the most cost effective and environmentally friendly way of recycling this natural resource.

It takes from 1 million to 4.5 million gallons of fresh water to fracture a horizontal well. This water may be untreated water available from local streams, ponds, and wells or may be treated water purchased from a municipal water utility. Water is typically trucked to the well site by tanker trucks, which carry roughly five thousand gallons per trip. For instance, if approximately 300 five thousand gallon tanker trucks are used to carry away more than one million gallons of flowback water per well the amount of fuel consumed in addition to the loss of water is unacceptable. For a 3 well frac site these numbers will increase by a factor of three.

The present invention provides a cost-effective onsite cavitation reactor that combines ozone, hydrodynamic cavitation, acoustic cavitation and electro-precipitation for enhanced water treatment. The treatment apparatus is sized and configured to optimize the amount of water to be processed. The treatment system is compact, transportable and self-contained, including both the processing equipment and the power supply to the run system. It is also configured to be compact in overall size to facilitate its use a remote well sites.

The treatment device is also readily transportable such that it can be moved from well site to well site.

SUMMARY OF THE INVENTION

The instant invention is directed to an improved treatment apparatus that introduces high intensity acoustic energy and ozone into a conditioning container to provide a mechanical separation of materials by addressing the non-covalent forces of particles or van der Waals force. The invention further discloses hydrodynamic cavitation of the ozone and effluent prior to entry into the treatment apparatus to improve to improve the mixture of effluent with ozone. The ultrasound transducers used to provide the acoustic energy strategically located within the treatment apparatus to accelerate mass transfer as well as electrodes to break down contaminants at a faster rate.

Thus an objective of the invention is to provide a high capacity compact and improved cavitation reactor to treat fluids, the fluids are subjected to ozone saturation and flash mixed with hydrodynamic cavitation and ultrasonic transducers or varying frequencies to initiate flotation of oils and suspended solids and the conversion of ozone to hydroxyl radicals.

Yet still another objective of the invention is to disclose the use of a cavitation reactor that can be used in treatment of most any type of fluid by providing an effective means to destroy aerobic and anaerobic bacteria "on the fly", and provide a reduction in contaminants.

Still another objective of the invention is to provide an improved cavitation reactor that eliminates the need for biocide and anti-scalant chemical typically employed in frac waters.

Still another objective of the invention is to provide a process to reduce scaling tendencies without the aid of acid, ion exchange processes, or anti scaling chemicals.

Yet another objective of the invention is to a process for lowering scaling tendencies in frac, flowback water, as demonstrated by dynamic tube-blocking tests Another objective of the invention is employ nano-cavitation imploding bubbles to provide the liquid gas interface that is instantaneously heated to approximately 900 degrees Fahrenheit which oxides all organic compounds through sonoluminescence.

Still another objective of the invention is to provide an improved cavitation reactor for an on-site process that will lower the cost of oil products by reducing the current and expensive processes used for off-site treatment of waste fluids.

Another objective of the invention is to provide an improved cavitation reactor for on-site process that will extend the life of fields and increase the extraction rate per well.

Still another objective of the instant invention is to teach the combination of ultrasonic and hydrodynamic agitation in conjunction with ozone introduction into a closed pressurized generally cylindrically shaped container whereby the cavitations cause disruption of the materials allowing the ozone to fully interact with the contaminated flow back water for enhancement of separation purposes. In addition, anodes in the outlet line provide DC current to the flowback water to drive the electro precipitation reaction for the hardness ions present with the flowback water.

Still another objective is to teach a process of enhanced ozone injection wherein ozone levels can be made more effective.

Another objective of the invention is to provide a cost effective and environmentally friendly process and apparatus for cleaning and recycling frac water at the well site using transportable equipment.

Other objectives and advantages of this invention will become apparent from the following description taken in conjunction with the accompanying drawings herein set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 9A is a perspective view of the skid mounted treatment system including the suction intake manifold and associated inlets.

FIG. 9B is a perspective view of the suction intake manifold and associated inlets.

FIG. 9C is a sectional view of the suction intake manifold and associated inlets.

DETAILED DESCRIPTION OF THE PREFERRED EMBODIMENT

Figure 1A:
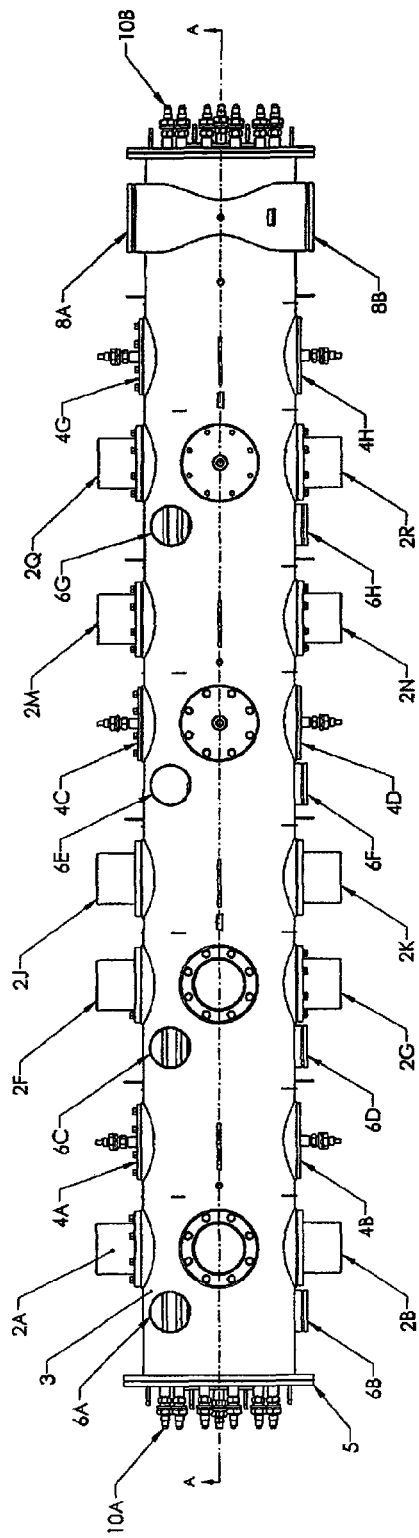
FIG. 1A is a top view of the main reactor of the treatment system.
Figure 1B:
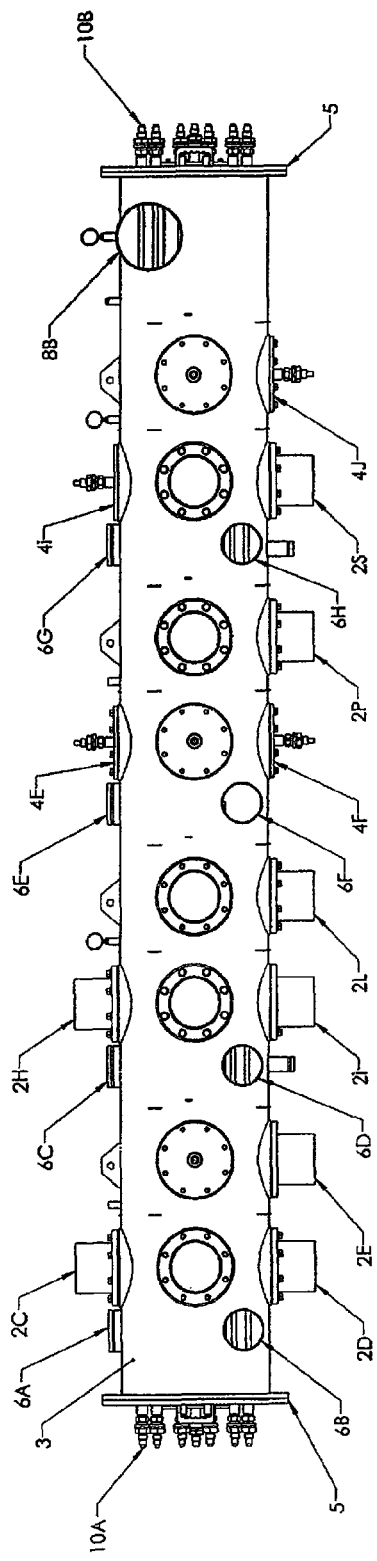
FIG. 1B is a side view of the main reactor of the treatment system.

FIG. 1A is a top view of the main reactor 1 of the treatment system and FIG. 1B is a side view of the main reactor 1. The main reactor 1 includes a cylindrical housing 3 that is, by way of example, approximately 16.5 feet long and 2 feet in diameter. A circular end plate 5 is mounted on each end of the cylindrical housing 3. Located along the length of the cylindrical housing are eighteen ultrasonic transducers 2A,2B,2C, 2D,2E,2F, 2G, 2H, 2J,2K, 2L, 2M,2N, 2P,2Q, 2R and 2S. Each of the ultrasonic transducers is rated at 500 W capacity and is also equipped with a heated plate that is rated at 1000 W. At given flow rates it maintains a ΔT of 40 degrees that enhances the precipitation within the main reactor. Each transducer can produce an acoustic output in the range of 16 to 20 KHz and can be individually adjusted to the desired output frequency. Each transducer includes a diaphragm that is balanced with the help of a pressure compensation system so that a maximum amount of ultrasonic energy is released into the fluid. The transducer assemblies are installed around the periphery of the cylindrical housing 3 creating a uniform ultrasonic environment that helps to increase the mass transfer efficiency of the ozone. The acoustic cavitations generated by the ultrasonic generators also greatly enhance the oxidation rate of organic material with ozone bubbles and ensure uniform mixing of the oxidant with the fluid. Each transducer assembly includes mounting flange that is sized to mate with a flange on the cylindrical housing 3. A series of ten disc anodes 4A,4B,4C,4D,4E,4F,4G,4H,4I and 4J are positioned along the length of the cylindrical housing 3. Each of the disc anodes located in the main reactor 1 has a surface area of approximately 50.26 square inches. The current density for these set of disc anodes are 1.5 Amps/square inch. Each circular end plate 5 supports a series of twelve insulated anode electrodes 10A, and 10B. The twenty four anode rods within the two sets of twelve, 10A and 10B, are approximately seven feet in length and each have a surface area of approximately 197.92 square inches with a current density of 0.6315 amps per square inch. The main reactor tank has eight inlets 6A, 6B, 6C, 6D, 6E, 6F, 6G and 6H positioned along the length of the cylindrical housing 3. Also positioned at one end of the cylindrical housing 3 on the upper most side is a pair of outlets 8A and 8B.

Figure 2:
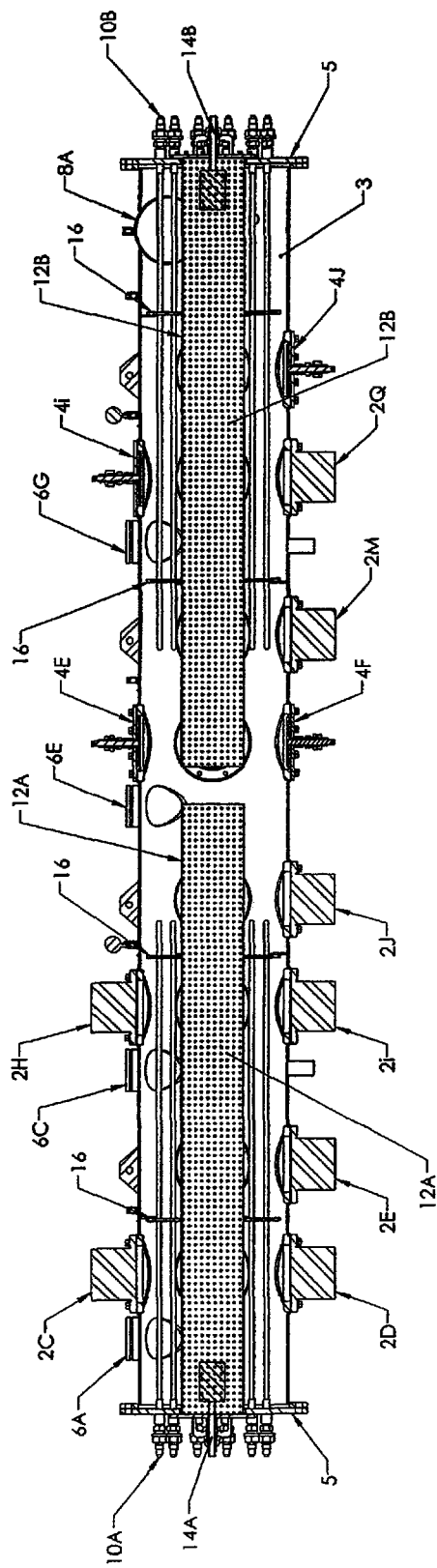
FIG. 2 is a sectional view of the main reactor taken along line A-A shown in FIG. 1A.

FIG. 2 is a cross sectional view of the main reactor 1 taken along line A-A as shown in FIG. 1A. As shown therein, cylindrical mono polar cathode screens 12A and 12B are each affixed to one of the circular end plates 5. These cylindrical cathode screens are approximately eight feet in length and promote efficient migration of electrons. The cylindrical screens 12A and 12B are negatively charged to facilitate the precipitation of crystals to adhere to the wall of the cylindrical screens 12A and 12B. Each series of anode rods 10A and 10B are supported within the main reactor 1 by a pair of supports 16 that are each attached to the inner cylindrical wall of the main reactor 1. Likewise, each cylindrical cathode screen, 12A and 12B, is support by one of the two pairs of supports 16. Cylindrical cathode screen 12A is electrically connected via connector 14A and cylindrical cathode screen 12B is electrically connected via electrical connector 14B.

Figure 3:
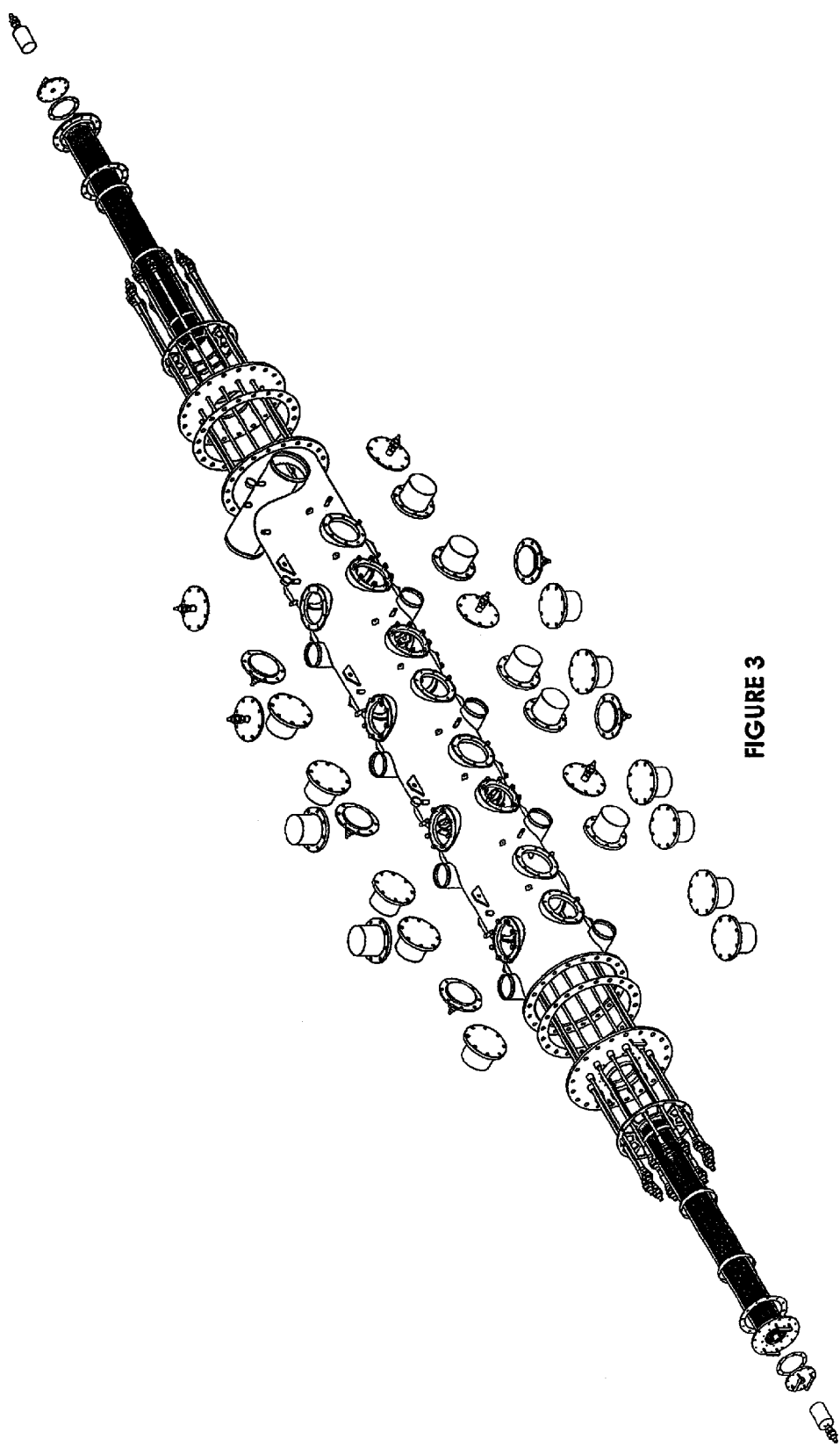
FIG. 3 is an exploded view of the main reactor.

FIG. 3 is an exploded view of the main reactor 1 and associated components as described above in FIGS. 1A, 1B and 2.

Figure 4:
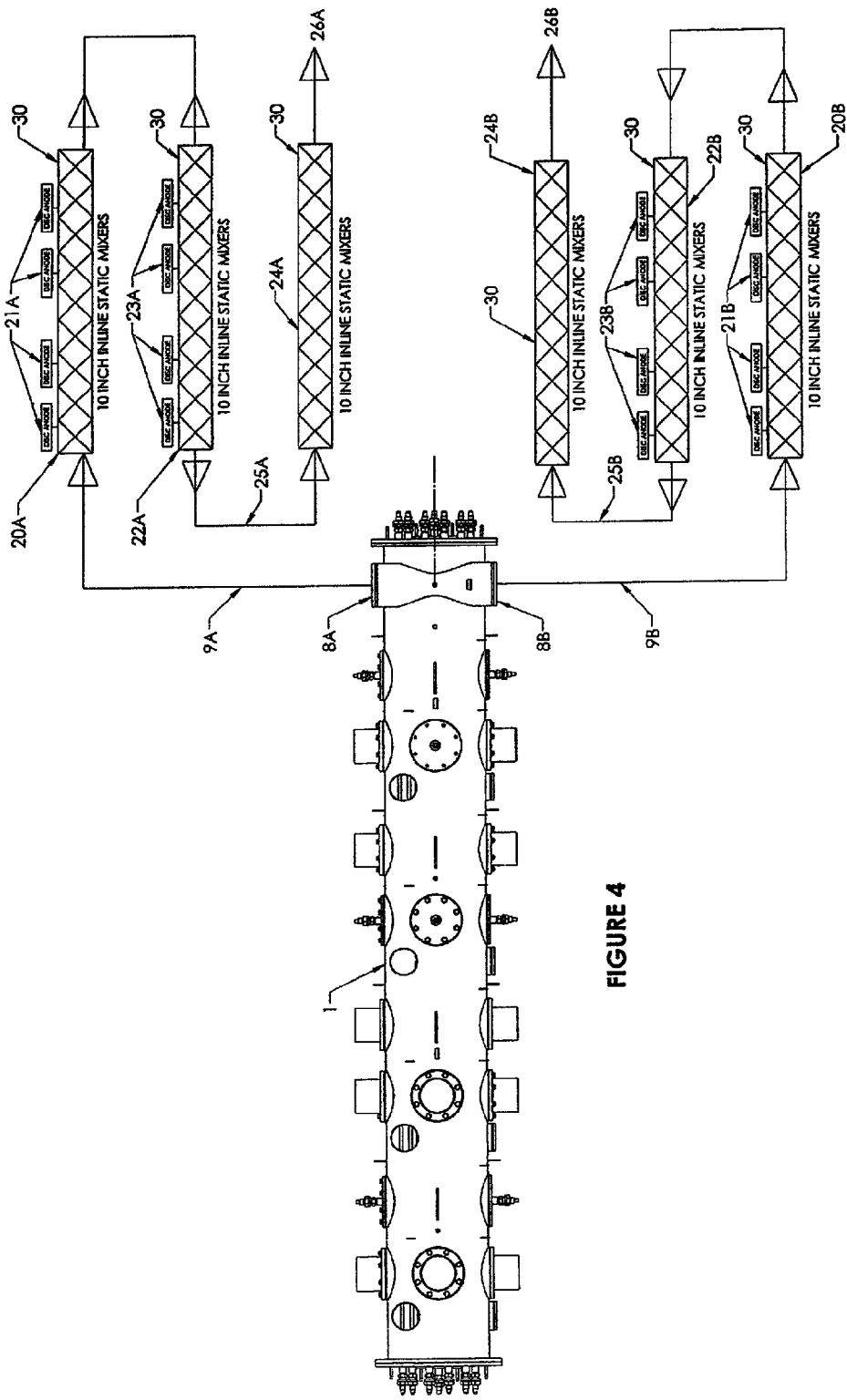
FIG. 4 is a pictorial view of the main reactor and a schematic view of the flow treatment downstream of the main reactor.

FIG. 4 is a pictorial view of the main reactor 1 and a schematic view of the flow treatment downstream of the main reactor. The output of main reactor 1 is directed via outlets 8A and 8B, via connecting flow conduits 9A and 9B, to first fluid treatment conduits 20A and 20B, respectively. Each first fluid treatment conduit 20A and 20B has an inner diameter of approximately ten inches and is approximately seventeen feet in length. Positioned within the first treatment conduits are a plurality of fixed static mixers that are positioned along the entire length of the conduits 20A and 20B. Static mixers 30 are a series of geometric mixing elements fixed within the conduit and create hydrodynamic cavitation within treatment conduits 20A and 20B. Each of the geometric mixing elements includes multiple orifices which uses the energy of the flow stream to create mixing between two or more fluids/gases. The optimized design of static mixers achieves the greatest amount of mixing with the lowest pressure loss possible. The static mixers 30 are described in more detailed in FIGS. 12A through 12C herein below. Each of the first fluid treatment conduits 20A and 20B includes four separate disc anodes 21A and 21B, respectively. The disc anodes 21A and 21B help to facilitate the production of hydroxyl radicals. The flow exiting first fluid treatment conduits 20A and 20B are then directed to second fluid treatment conduits 22A and 22B, respectively. Second fluid treatment conduits 22A and 22B have an internal diameter of approximately ten inches and are approximately seventeen feet in length. Similar to the first fluid treatment conduits, second fluid treatment conduits 22A and 22B each have static mixers 30, creating hydrodynamic cavitation, and four disc anodes 23A and 23B, respectively. As in the first treatment conduits, the disc anodes 23A and 23B help to facilitate the production of hydroxyl radicals. The flow exiting second treatment conduits 22A and 22B are directed into third treatment conduits 24A and 24B, respectively. The third treatment conduits 24A and 24B have an internal diameter of approximately ten inches and are approximately seventeen feet in length. The third treatment conduits 24A and 24B each have static mixers 30 throughout their length, thereby creating hydrodynamic cavitations. The flow exiting the third treatment conduits 24A and 24B is directed to outlets 26A and 26B, respectively.

Figure 5:
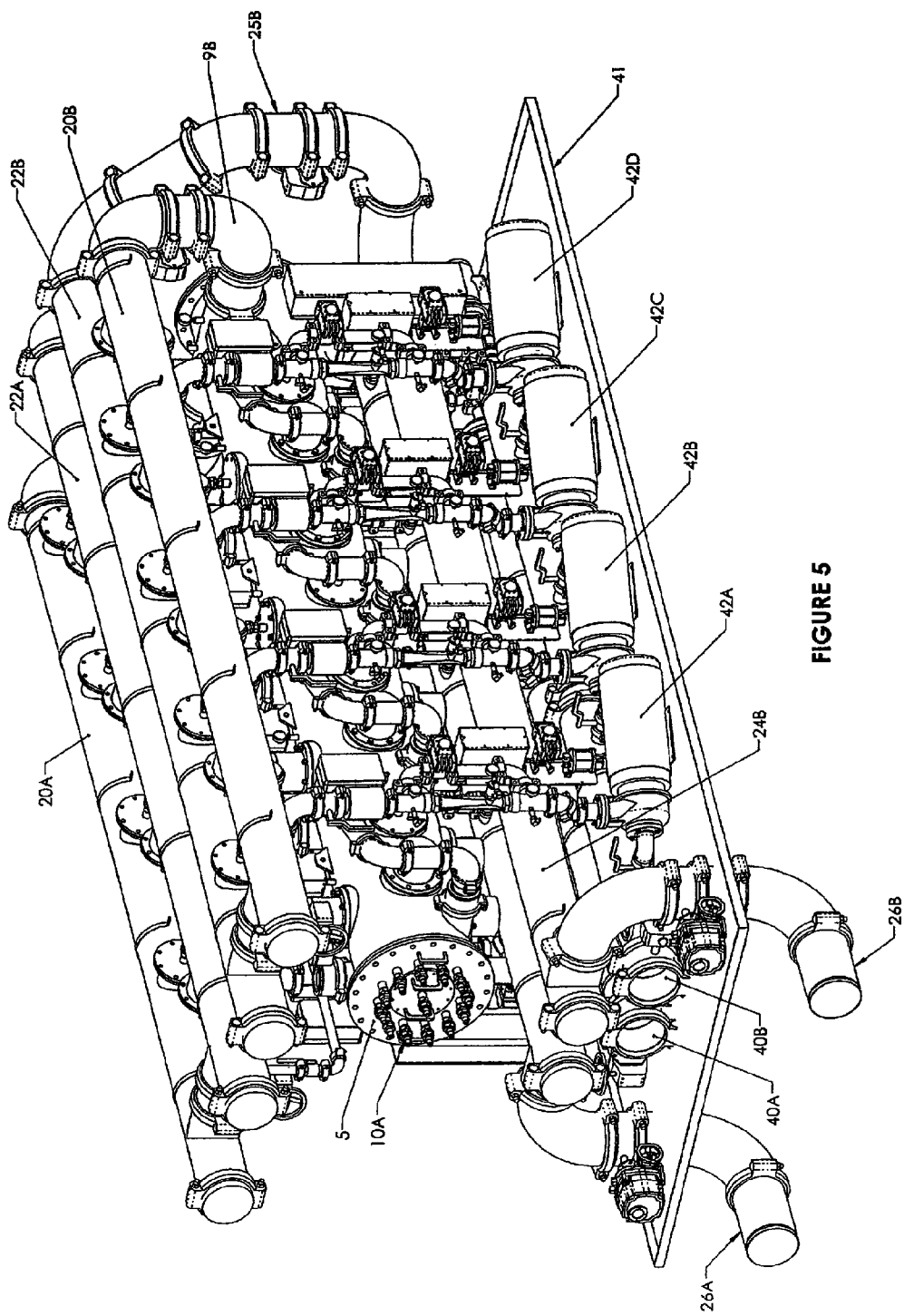
FIG. 5 is a perspective rear end view of the treatment system mounted on a skid.

FIG. 5 is a perspective rear end view of the treatment system mounted on a skid 41. By mounting the treatment system on a skid platform the equipment can be readily removed and repaired or replaced and then reinstalled into the mobile trailer unit as will be described later. As shown, the fluid treatment apparatus includes two inlets 40A and 40B. One side of the apparatus includes four suction pumps 42A, 42B, 42C and 42D. Each suction pump 42A, 42B, 42C and 42D fluidly connects the inlet pipe 40B to an ozone injection apparatus which is described and illustrated in FIGS. 10A and 10B. The treatment apparatus also includes two separate outlets 26A and 26B. As shown in this view, one end of the main reactor 1 has electrodes 10A mounted on a circular end plate 5. Connecting flow conduit 9B fluidly connecting main reactor 1 outlet 8B to first treatment conduit 20B. First fluid treatment conduit 20B is in turn fluidly connected to second fluid treatment conduit 22B. Second fluid treatment conduit 22B is fluidly connected via connecting flow conduit 25B to third fluid treatment conduit 24B. The fluid exits the third fluid treatment conduit 24B via an outlet 40B.

Figure 6:
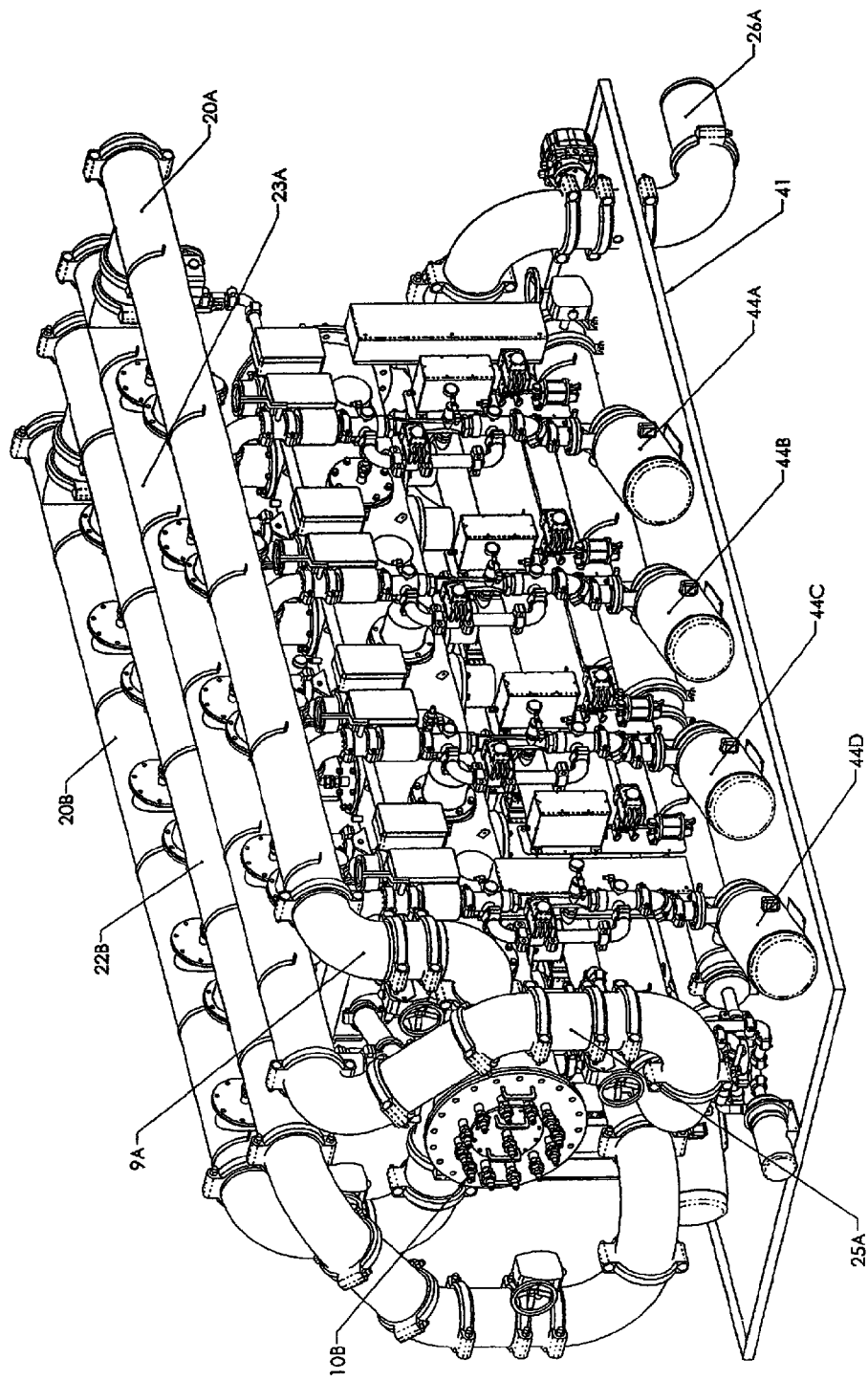
FIG. 6 is a perspective front-end view of the treatment system mounted on a skid.

FIG. 6 is a perspective front-end view of the treatment system mounted on a skid. This view is a side view opposite to that shown in FIG. 5. As illustrated, this side of the treatment apparatus shows three suction pumps 44A, 44B, and 44C. It should be understood that it is possible to install a fourth pump (not shown) on this side as well as was shown in FIG. 5. Typically the reactor is configured with seven inlets and associated pumps and ozone injectors and operated with six of the inlets with one inlet held in reserve for use as needed. It should be noted that the system can be configured with up to eight inlets wherein all eight can be simultaneously operated. Each pump, either three or four in number, fluidly communicates with intake pipe 40A on the intake side of each pump and an ozone injection apparatus on the outlet side of the pump. The flow leaving main reactor 1 passes through connecting flow conduit 9B and into first treatment flow conduit 20A that in turn is communicated to second fluid treatment conduit 22A. The flow leaving second fluid treatment conduit 22A then passes through connecting flow conduit 25B and into third fluid treatment conduit 24B. The fluid exits the third fluid treatment conduit 24A via an outlet 26A.

Figure 7:
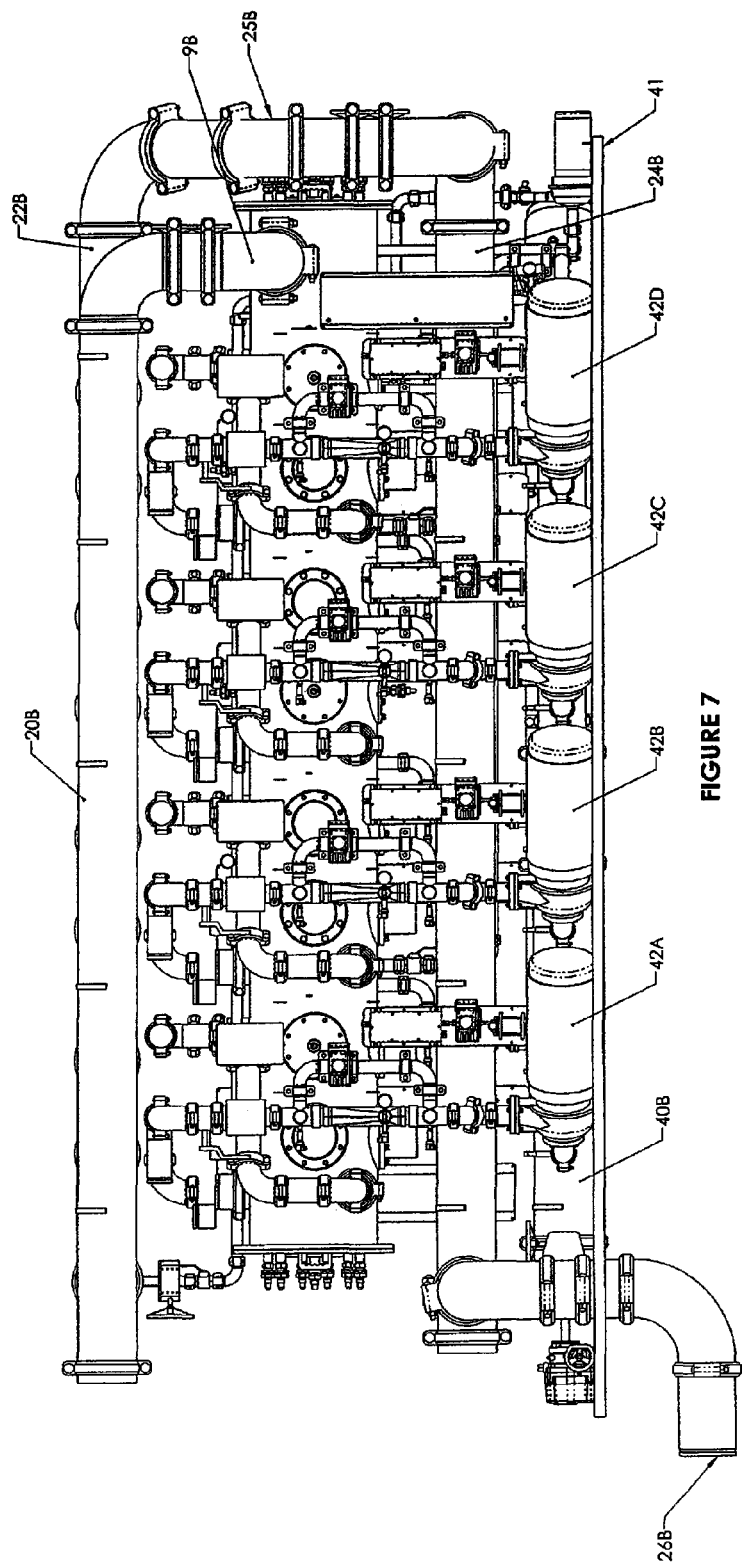
FIG. 7 is a left side view of the treatment system mounted on a skid.

FIG. 7 is a left side view of the treatment system mounted on a skid 41. This view shows suction pumps 42A, 42B, 42C and 42D each drawing fluid from intake conduit 40B and outputting the flow to an ozone injection apparatus which in turn conveys the fluid to the main reactor housing 1. Also shown in this view is connecting flow conduit 9B that connects outlet 8B with first fluid treatment conduit 20B. Also shown in this view is second fluid treatment conduit 22B that is fluidly connected to the third fluid treatment conduit 24B via connecting flow conduit 25B. The third fluid treatment conduit is connected to outlet 26B.

Figure 8:
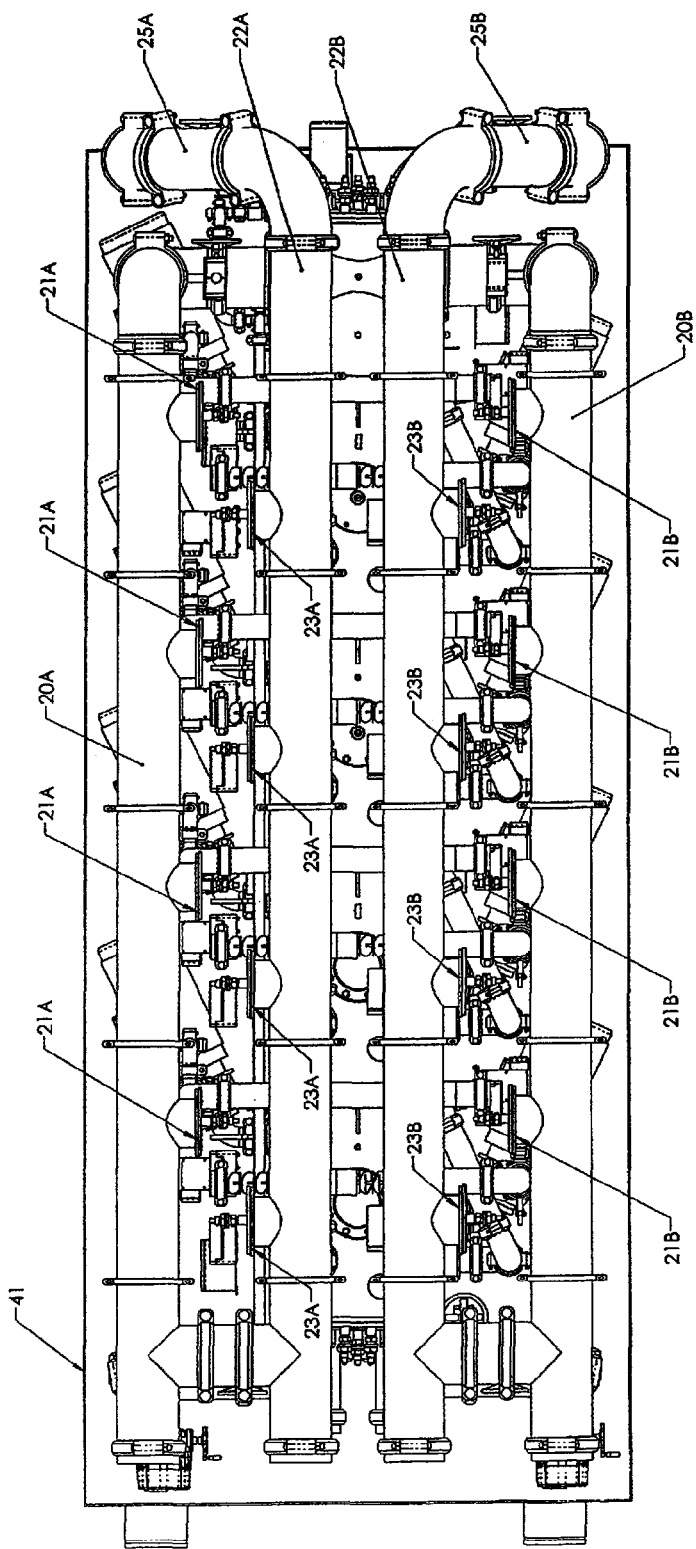
FIG. 8 is a top view of the treatment system mounted on a skid.

FIG. 8 is a top view of the treatment system mounted on the skid 41. As seen in the figure the first treatment conduit 20A contains four disc anodes 21A and first treatment conduit 20B also contains four disc anodes 21B. In a similar fashion the second treatment conduit 22A contains four disc anodes 23A and the other second treatment conduit 22B contains four disc anodes 23B. Connecting flow conduit 25A fluidly connects second treatment conduit 22A to the third treatment conduit 24A and the other connecting flow conduit 25B connects the second treatment conduit 22B to the third treatment conduit.

FIG. 9A is a perspective view of the skid mounted treatment system including the suction intake manifold and associated inlets. The suction intake manifold in mounted below the skid 41. As shown in FIG. 9B the suction manifold 50 includes four inlets 52, 54, 56, and 58. At the end of the suction manifold 50 is a suction box 60. As shown in FIG. 9C the suction box 60 includes a mesh screen 62 with 0.5-inch apertures to arrest debris and particulates greater than 0.5 inches in size. The suction box 60 and mesh screen 62 can be accessed from the rear end of the box 60. The suction manifold 50 is constructed with hydrodynamic static mixer vanes 64 positioned within the manifold between the inlets 52 and 56 and the suction box 60. The construction of these static-mixing devices is described in FIGS. 12A through 12C to follow. Static mixer vanes encourage the homogeneous mixing of the fluid before entering the main reactor 1. As will be described, the holes formed within the mixing vanes acts as orifices and allow varying pressure at multiple locations. The local pressure drops in flow through the manifold produces cavitations bubbles. These cavitation bubbles collapse as the pressure is again raised. The collapse of the cavitation bubbles produces oxidation of organic substances in the fluid. The suction manifold 50 has two outlets 66A and 66B. Outlets 66A and 66B are sized and configured to mate up with inlet conduits 40A and 40B, respectively.

Figure 10B:
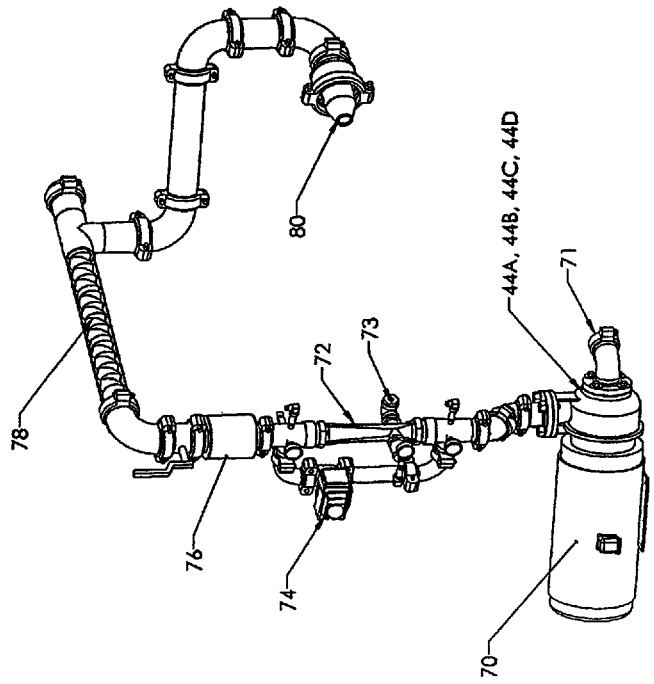
FIG. 10B is a perspective view of one of the ozone mixing arrangements including a fluid inlet pump, ozone injection device, a flash reactor, a static mixer and a discharge nozzle on the right side of the main reactor as viewed from the front.
Figure 10A:
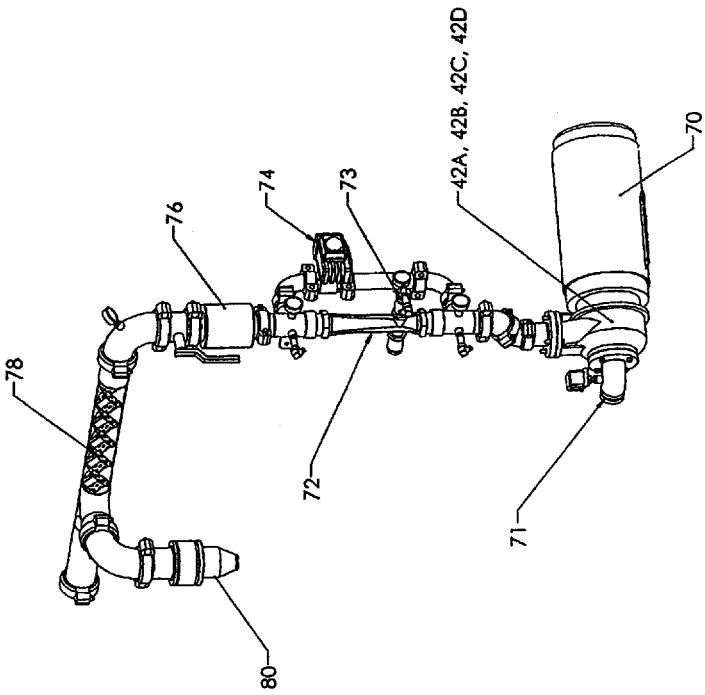
FIG. 10A is a perspective view of one of the ozone mixing arrangements including a fluid inlet pump, ozone injection device, a flash reactor, a static mixer and a discharge nozzle on the left side of the main reactor as viewed from the front.

FIG. 10A is a perspective view of one of the ozone mixing arrangements on the left side of the main reactor as viewed from the front and FIG. 10B is a perspective view of one of the ozone mixing arrangements on the right side of the main reactor as viewed from the front. FIG. 10A shows one of the pumps 42A, 42B, 42C or 42D mechanically connected to an electric motor 70. The pump has an inlet 71 that draws in fluid from the inlet conduit 40B. FIG. 10B shows one of the pumps 44A, 44B or 44C mechanically connected to an electric motor 70. Downstream of the pump is a venturi type-mixing device 72 to inject ozone into the fluid flow. By way of example this can be a Mazzie® injector. The venturi type injector has an ozone inlet 73. An air compressor feeds an oxygen generator that in turn feeds an ozone generator. The output of the ozone generator is then automatically metered into each of the venturi type mixing devices as is shown in FIGS. 17A through 17DD. The pressure drop across the venturi is controlled by an automated bypass valve 74 using a PID control loop. Downstream of the venturi type injector is a flash reactor 76. The flash reactor 76 uses pressure velocity to create turbulence. Higher cavitation energy dissipation is observed in the flash reactor 76. The turbulence in the reactor 76 creates high shear making the ozone gas bubbles smaller thereby creating a higher mass transfer efficiency. The flash reactor is described in FIGS. 11A-11C described below. Downstream of the flash reactor 76 is an inline static mixer 78 formed from a series of static blades with apertures, as will be described in FIGS. 12A through 12C, positioned within a 4-inch conduit. The static mixer 78 creates hydrodynamic cavitation and produces cavitation bubbles locally at the orifices of the vanes. As these cavitation bubbles implode within the high-pressure area, energy is released in the fluid in the form of heat, light, and mechanical vibration thereby destroying/degrading the organic contaminants. Located downstream of the in line static mixer 78 is a converging discharge nozzle 80. The conduit supporting the discharge nozzle 80 is fluidly sealed to the main reactor 1 and the nozzle itself is positioned within the main reactor. By way of example only, the converging discharge nozzle can be a Mazzie® nozzle N45. The discharge nozzle is used to increase the velocity of the fluid entering the main reactor that means a higher Reynolds Number and hence higher turbulence energy dissipation. The converging nozzle 80 enhances the systems performance with the venturi type injector 72. The converging discharge nozzle 80 provides a desired backpressure on the venturi type injector 72 and, the dynamic mixing under pressure results in greater mass transfer of the ozone into the fluid and permits a larger dosage of ozone to enter the fluid.

Figure 11B:
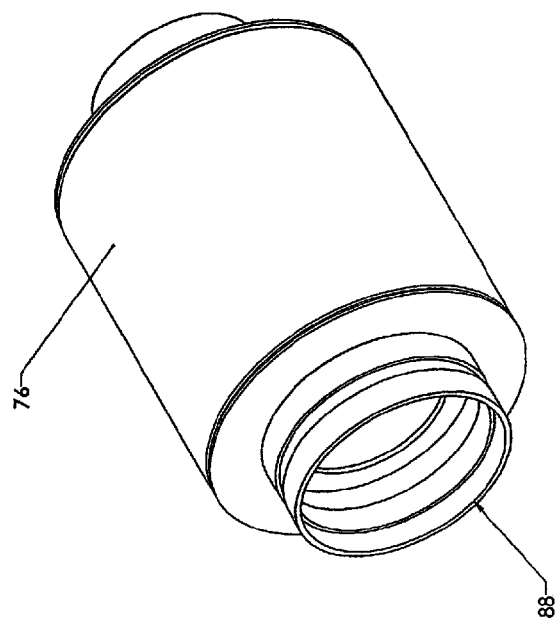
FIG. 11B is a perspective view of one of the flash reactors.
Figure 11C:
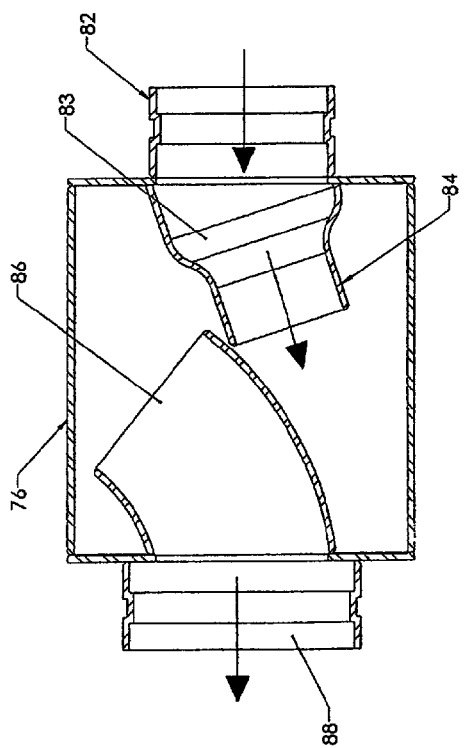
FIG. 11C is a sectional view of one of the flash reactors taken along line A-A of FIG. 11A.
Figure 11A:
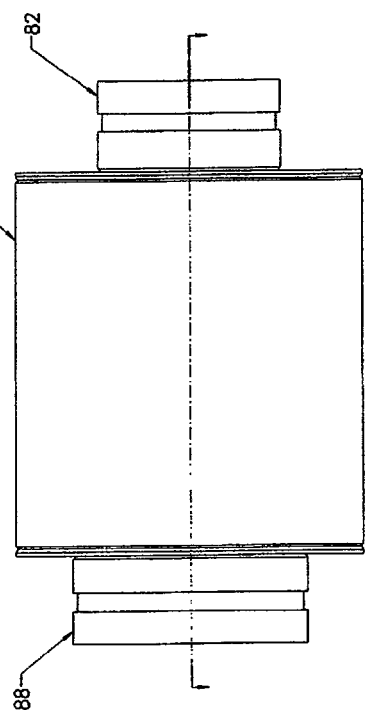
FIG. 11A is a side view of a one of the flash reactors.

FIG. 11A is a side view of a one of the flash reactors, FIG. 11B is a perspective view of one of the flash reactors and FIG. 11C is a sectional view of one of the flash reactors taken along line A-A of FIG. 11A. Flash reactor 76 is formed as a generally cylindrical housing and has in inlet conduit 82 that is smaller in diameter than outlet conduit 88. Within the flash reactor housing 76 the inlet conduit 82 is fluidly connected to a slightly curved section of conduit 83 having a reduced portion 84. Also within the flash reactor 76 is a curved section of conduit 86 that is fluidly connected to outlet conduit 88. The direction of curvature of conduit section 83 is opposite to that of curved conduit 86. As the flow of fluid that has been mixed with ozone is passed through the flash reactor 76 the sizes of gas bubbles are reduced to nano size by high shear. The uni-directional and shearing design of the gas/liquid water mixture allows for a rapid dissolution and attainment of gas/liquid equilibrium that results in high mass transfer efficiency with a minimal time. Due to the configuration of the flow paths within the flash reactor 76 there are different areas within the flash reactor where severe velocity and pressure changes take place. These drastic velocity and pressure changes create high shear that reduces the size of the ozone/oxygen bubbles to nano size and also dissolving more gas into the fluid that is under pressure.

Figure 12A:
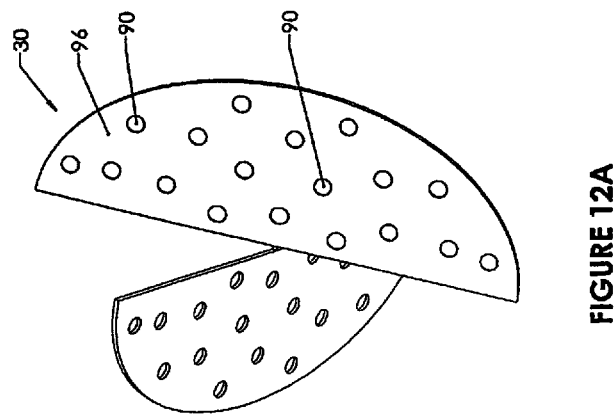
FIG. 12A is a perspective view of one of the inline static mixers.
Figure 12C:
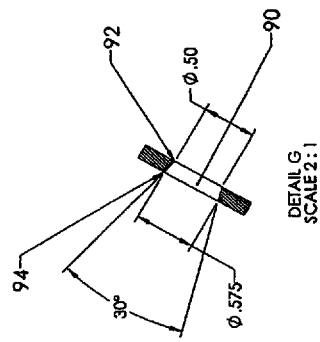
FIG. 12C is a detailed view of one of the holes in the inline static mixer shown in FIG. 12A.
Figure 12B:
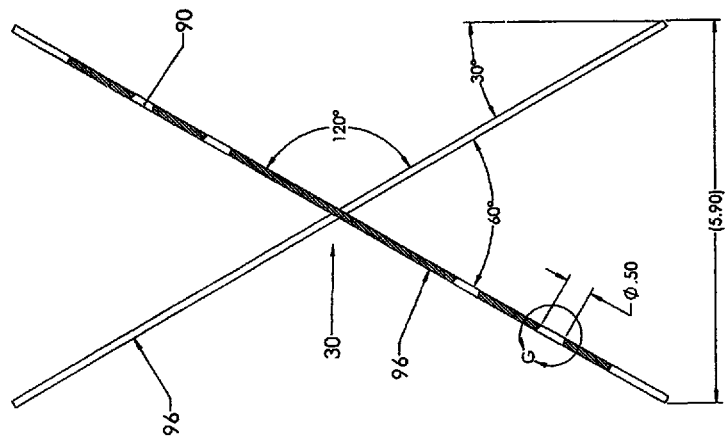
FIG. 12B is a cross sectional view of one of the static inline mixers.

FIG. 12A is a perspective view and FIG. 12B is a cross sectional view of one of the static inline mixers. FIG. 12C is a detailed view of one of the holes in the inline static mixer shown in FIG. 12A. The inline static mixers 30 in FIG. 4 are approximately 10 inches in diameter and are positioned adjacent to one another within the fluid treatment conduits 20A, 22A, 24A, 20B, 22B and 24B. The inline static mixers 64 are positioned adjacent one another within intake manifold 50, as shown in FIG. 9C, and are approximately 16 inches in diameter. The incline static mixers 78 are positioned adjacent one another as shown in FIGS. 10A and 10B and are approximately 4 inches in diameter. The views shown in FIGS. 12A through 12C are illustrative of the inline mixers 30, being approximately ten inches diameter. The inline static mixers 64 and 78 are of similar construction to mixer 30 except that the four-inch mixer 78 has fewer holes per baffle 96 than mixer 30 and the 16-inch inline mixer 78 has more holes per baffle 96 than the mixer 30. The holes 90 formed on each of the baffles 96 of the inline static mixers 30, 64 and 78 are formed as diverging nozzles having an inlet aperture 92 on the upstream side having a diameter that is smaller than the diameter of the outlet aperture 94 on the downstream side of the blade. The inlet aperture and outlet aperture are connected by a conically shaped bore 94, as shown in FIG. 12C. Static mixers 30, 64 and 78 are each formed as a series of geometric elements fixed within a conduit wherein each of the baffles 96 of the static mixing elements contains a plurality of holes 90 are formed as diverging nozzles. The static mixers use the energy of the flow stream to create mixing between two or more fluids. The static mixers are designed to achieve the greatest amount of mixing with the lowest possible pressure loss.

The multiple holes in each of the baffles of the static mixers act as localized orifices, dropping the pressure of the fluid locally allowing the formation of cavitation bubbles. As these cavitation bubbles are carried away with the flow, these bubbles collapse or implode in the zone of higher pressure. The collapse of the cavitation bubbles at multiple locations within the treatment system produces localized high-energy conditions such as shear, high pressure, heat light, mechanical vibration, etc. These localized high-energy conditions facilitate the breakdown of organic substances. The baffles are arranged so that when the fluid is discharged from one baffle, it discharges with a swirling action and then strikes the downstream baffle. The baffles provide a local contraction of the flow as the fluid flow confronts the baffle element thus increasing the fluid flow pressure. As the fluid flow passes the baffle, the fluid flow enters a zone of decreased pressure downstream of the baffle element thereby creating a hydrodynamic cavitation field. Hydrodynamic cavitation typically takes place by the flow of a liquid under controlled conditions through various geometries. The phenomenon consists in the formation of hollow spaces which are filled with a vapor gas mixture in the interior of a fast flowing liquid or at peripheral regions of a fixed body which is difficult for the fluid to flow around and the result is a local pressure drop caused by the liquid movement. At a particular velocity the pressure may fall below the vapor pressure of the liquid being pumped, thus causing partial vaporization of the cavitating fluid. With the reduction of pressure there is liberation of the gases that are dissolved in the cavitating liquid. These gas bubbles also oscillate and then give rise to the pressure and temperature pulses. The mixing action is based on a large number of forces originating from the collapsing or implosions of cavitation bubbles. If during the process of movement of the fluid the pressure at some point decreases to a magnitude under which the fluid reaches a boiling point for this pressure, then a great number of vapor filled cavities and bubbles are formed. Insofar as the vapor filled bubbles and cavities move together with the fluid flow, these bubbles move into an elevated pressure zone. Where these bubbles and cavities enter a zone having increased pressure, vapor condensation takes place within the cavities and bubbles, almost instantaneously, causing the cavities and bubbles to collapse, creating very large pressure impulses. The magnitude of the pressure impulses with the collapsing cavities and bubbles may reach ultra high pressure implosions leading to the formation of shock waves that emanate form the point of each collapsed bubble.

Figure 13:
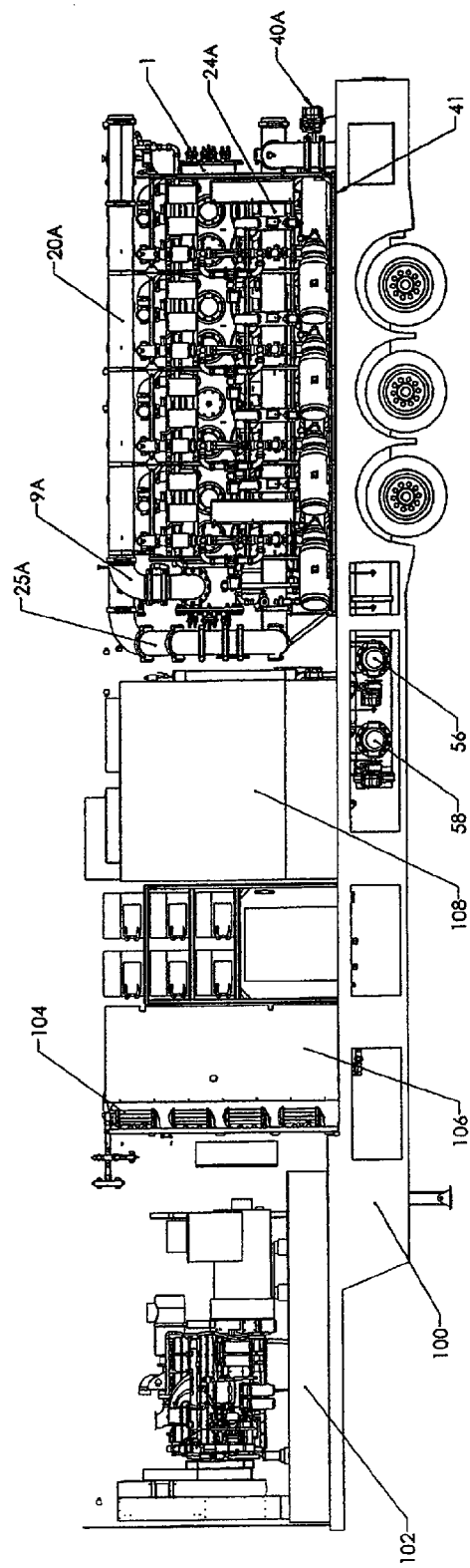
FIG. 13 is a side view of a trailer assembly including the treatment system, power generator, oxygen concentrator, ozone generator and control systems.

FIG. 13 is a side view of a trailer assembly 100 containing the treatment system. The complete system is packaged in a mobile trailer that is approximately 53 feet in length. At the forward end of the trailer assembly 100 is a 600 KW generator set 102 powered by a diesel engine. The system is capable of a flexible flow rate of 20-70 barrels per minute. It is capable of producing 2520 gal/minute flow rate with a supply water pressure within the range of 10-40 psi. It is also capable of handling a fluid input having a salinity range of 50-200,000 PPM. A plurality of oxygen concentrators 104 are mounted on a vertical wall within the trailer assembly 100. Also shown in FIG. 13 are an ozone panel 106 and a cooling water chiller 108. Visible from this side view are inlets 58, 56 and inlet conduit 40A. Also shown in FIG. 13 is main reactor 1, one of the first treatment conduits 20A, as well as connecting flow conduits 9A, 25A and one of the third fluid treatment conduits 24A. The fluid treatment system is mounted on a skid 41 for ease of removal, repair or replacement, and subsequent reinstallation through rear access of the trailer. The ability to swap out system component modules substantially minimizes system down time and improves the ability to repair the processing equipment in a quick and efficient manner. The main reactor 1 is approximately 16 feet in length.

Figure 14:
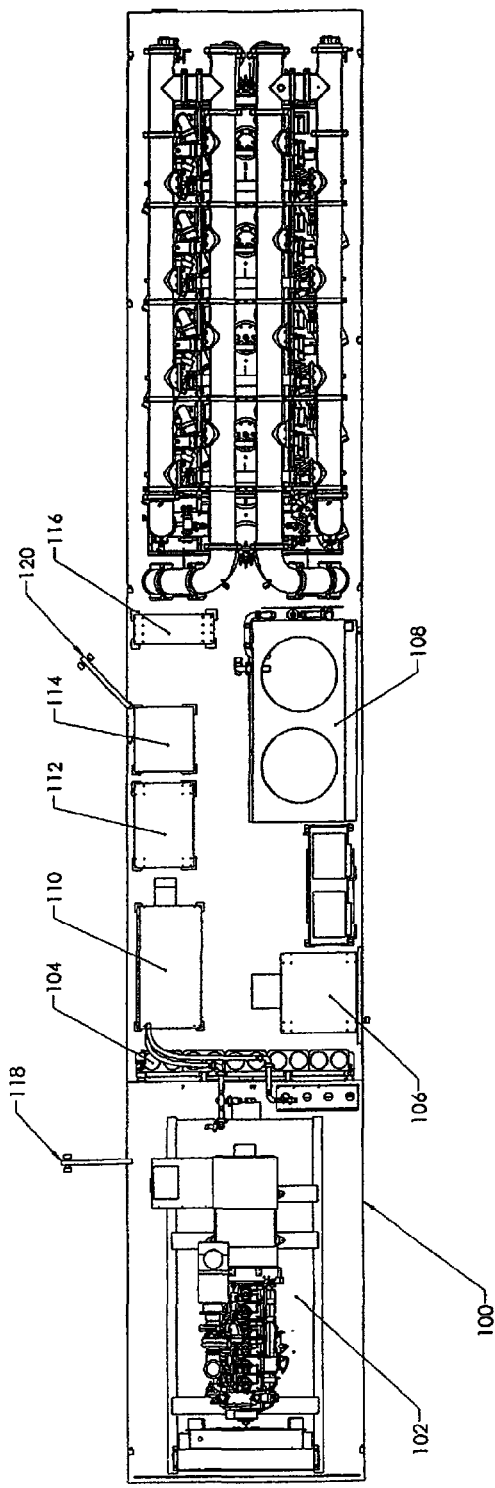
FIG. 14 is a top view of the trailer assembly shown in FIG. 13.

FIG. 14 is a top view of the trailer assembly shown in FIG. 13. This view of the trailer assembly 100 show the 600 KW generator set 102, the oxygen concentrators 104, the ozone panel 106 and the cooling water chiller 108. In addition, this view also shows air pumps 110, main panel 112, a DC power supply (e.g. 252 KW) to power the treatment system and power distribution panel 116. The trailer assembly 100 also includes two side access doors 118 and 120.

Figure 15:
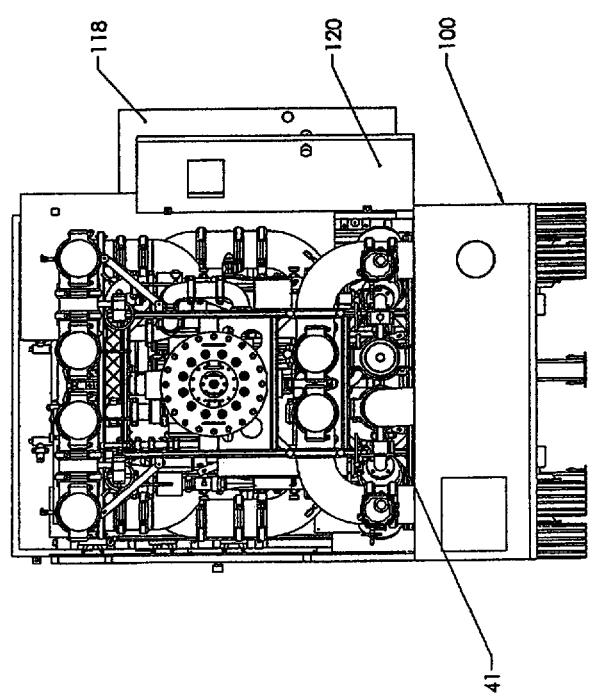
FIG. 15 is a rear view of the trailer assembly shown in FIG. 13.

FIG. 15 is a rear view of the trailer assembly 100 with the rear access open. As shown the treatment apparatus is supported on skid 41. Side doors 118 and 120 are shown in an open position.

Figure 16:
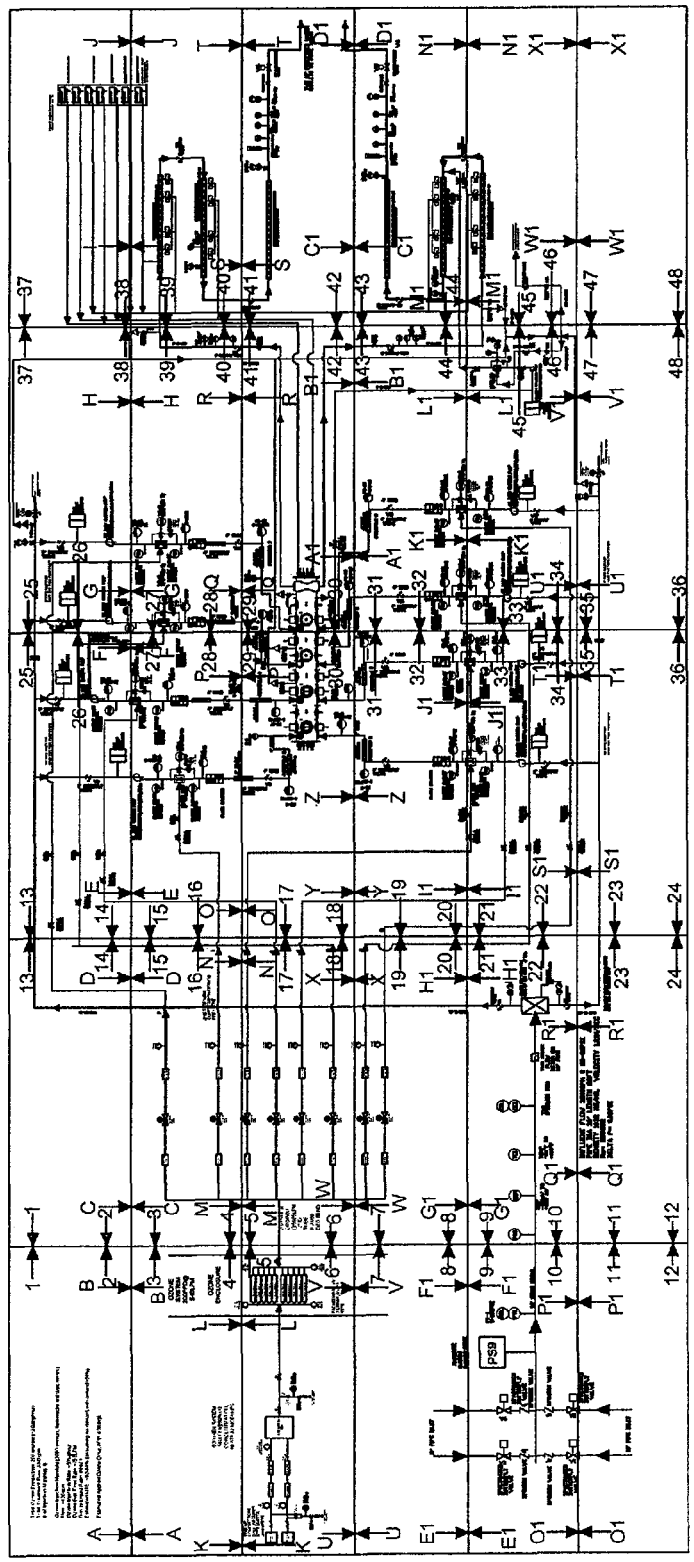
FIG. 16 is a complete P&ID (piping and instrument diagram) of the treatment system annotated with partition lines for FIGS. 17A through 17DD that are enlarged views for purpose of clarity.
Figure 17A:
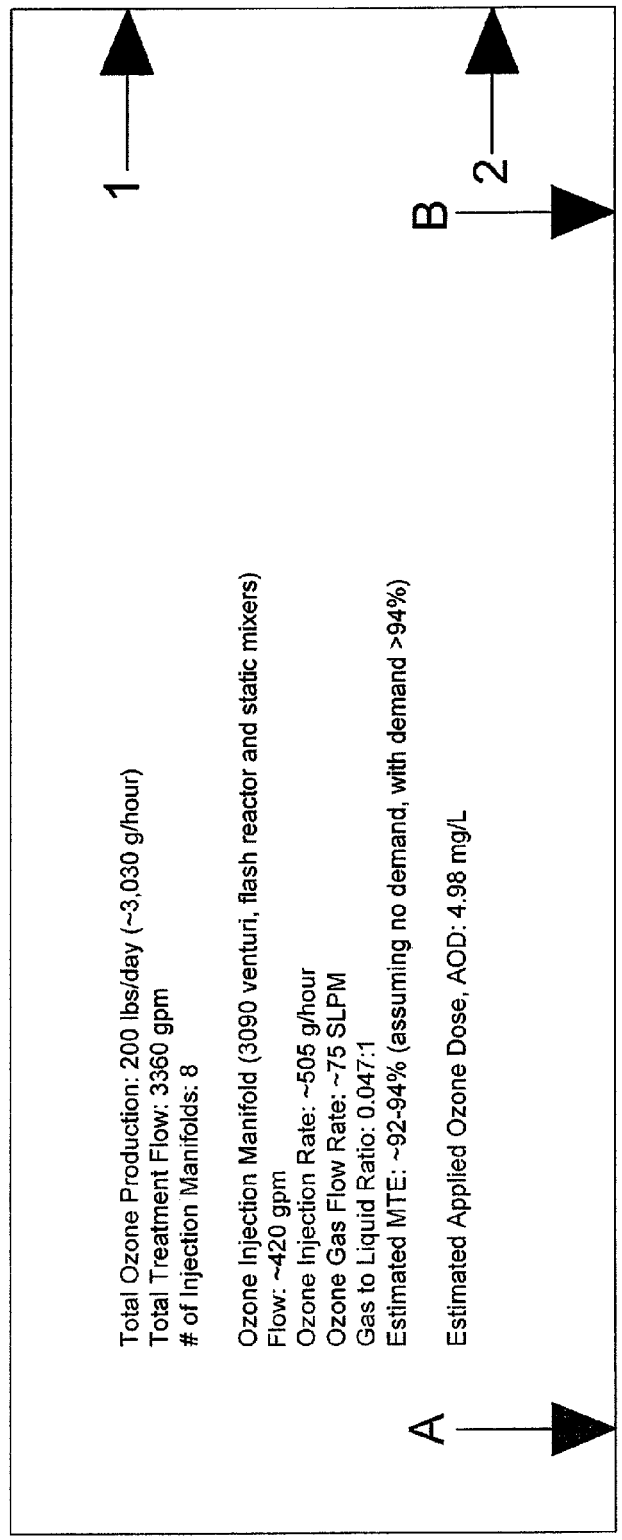
FIGS. 17A, 17B, 17C, 17D, 17E, 17F 17G, 17H, 17I, 17J, 17K, 17L, 17M, 17N, 17O, 17P, 17Q, 17R, 17S, 17T, 17U, 17V, 17W, 17X, 17Y, 17Z, 17AA, 17BB, 17CC, 17BB, 17CC and 17DD are enlarged views of various sections of the treatment as partitioned in FIG. 16.
Figure 17C:
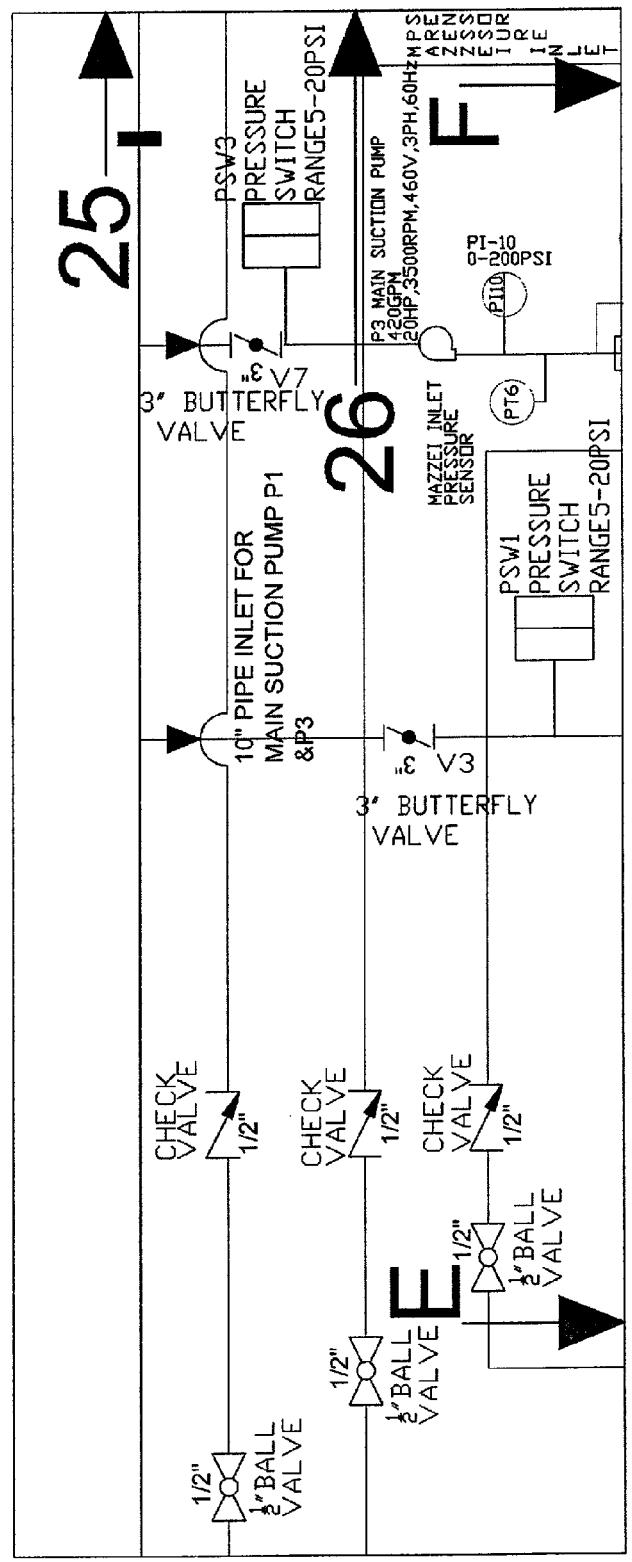
Figure 17D:
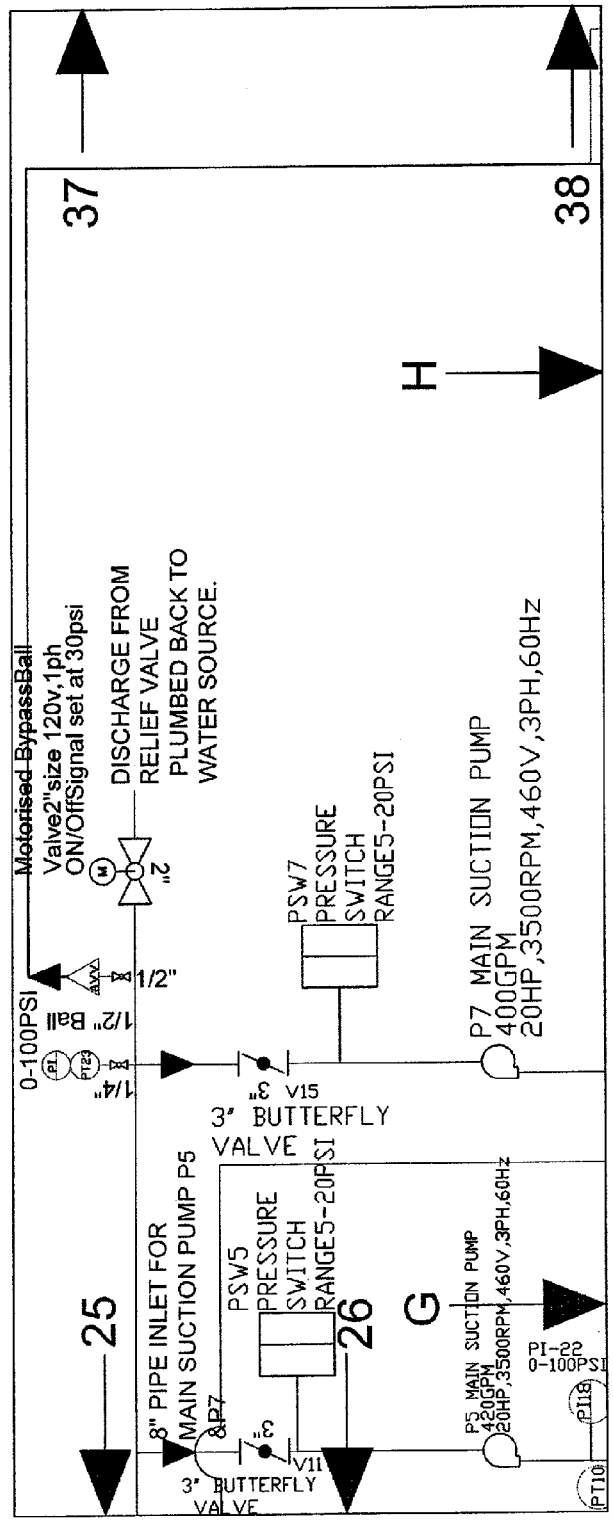
Figure 17E:
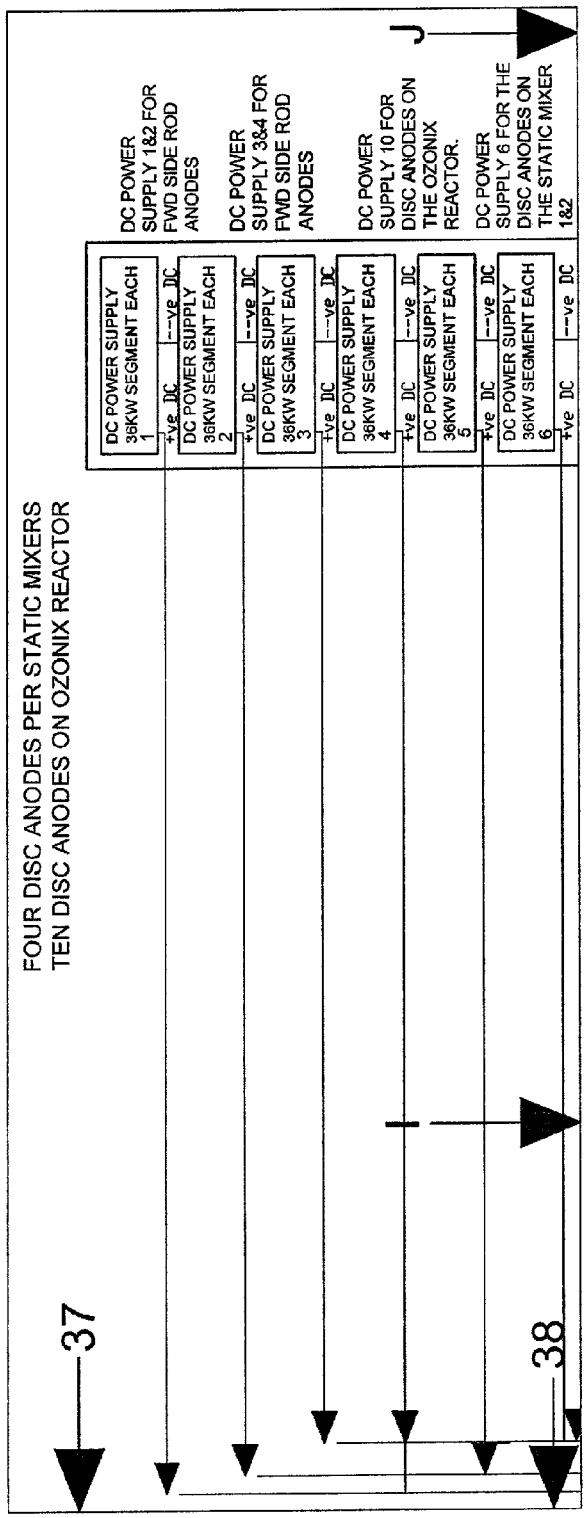
Figure 17F:
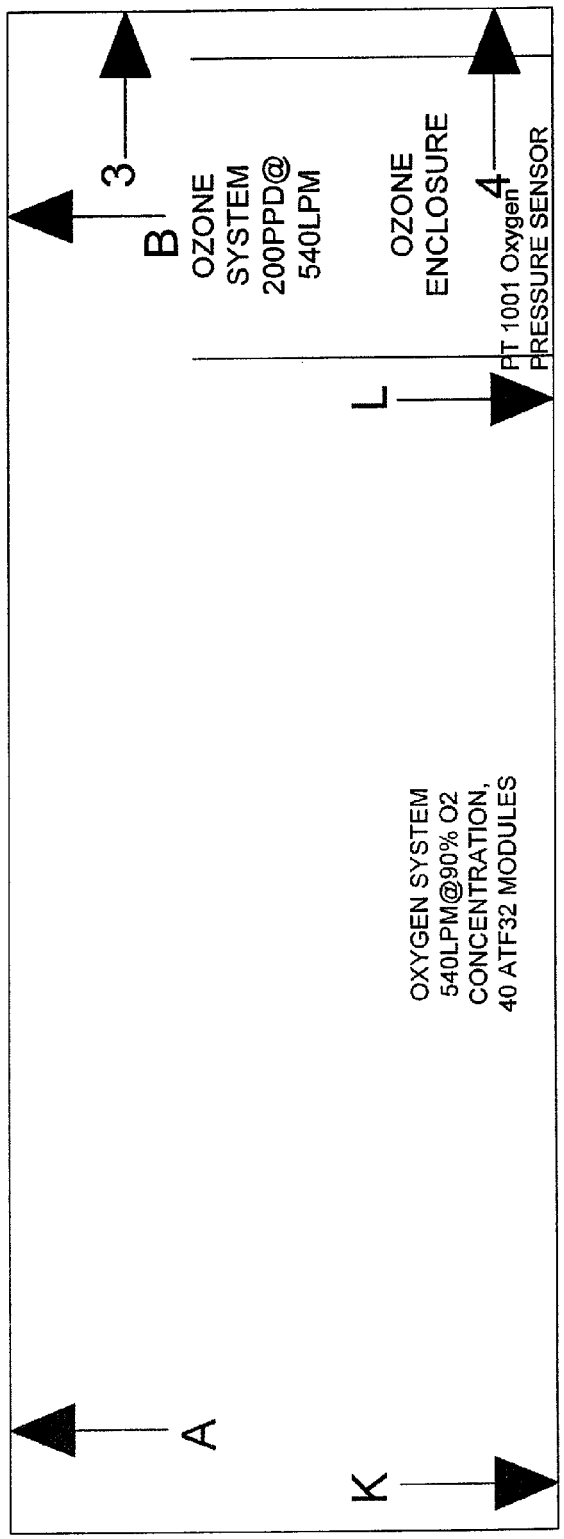
Figure 17G:
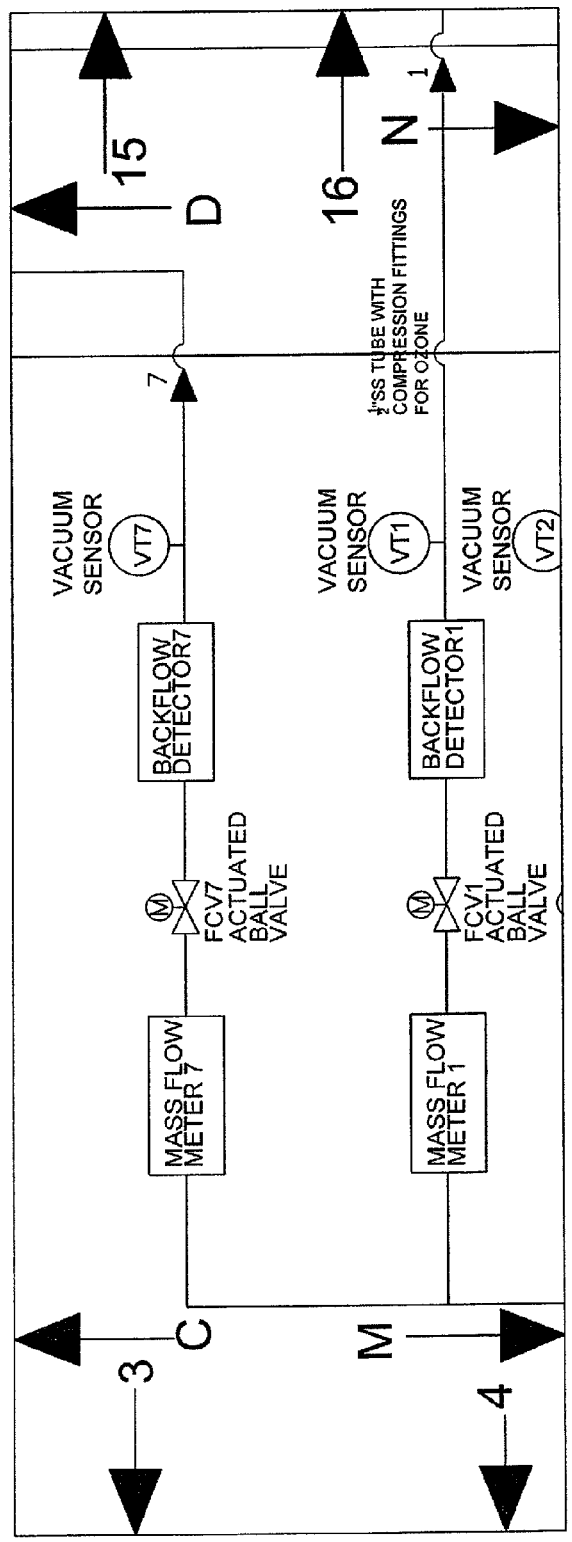
Figure 17H:
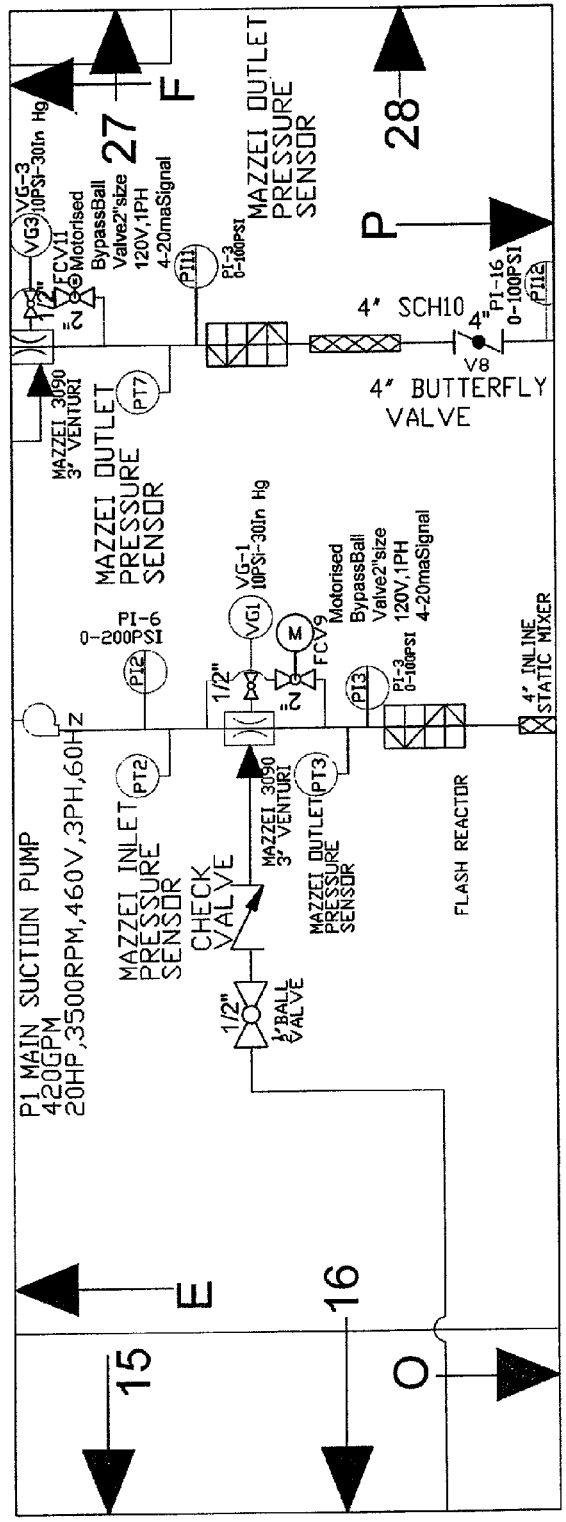
Figure 17I:
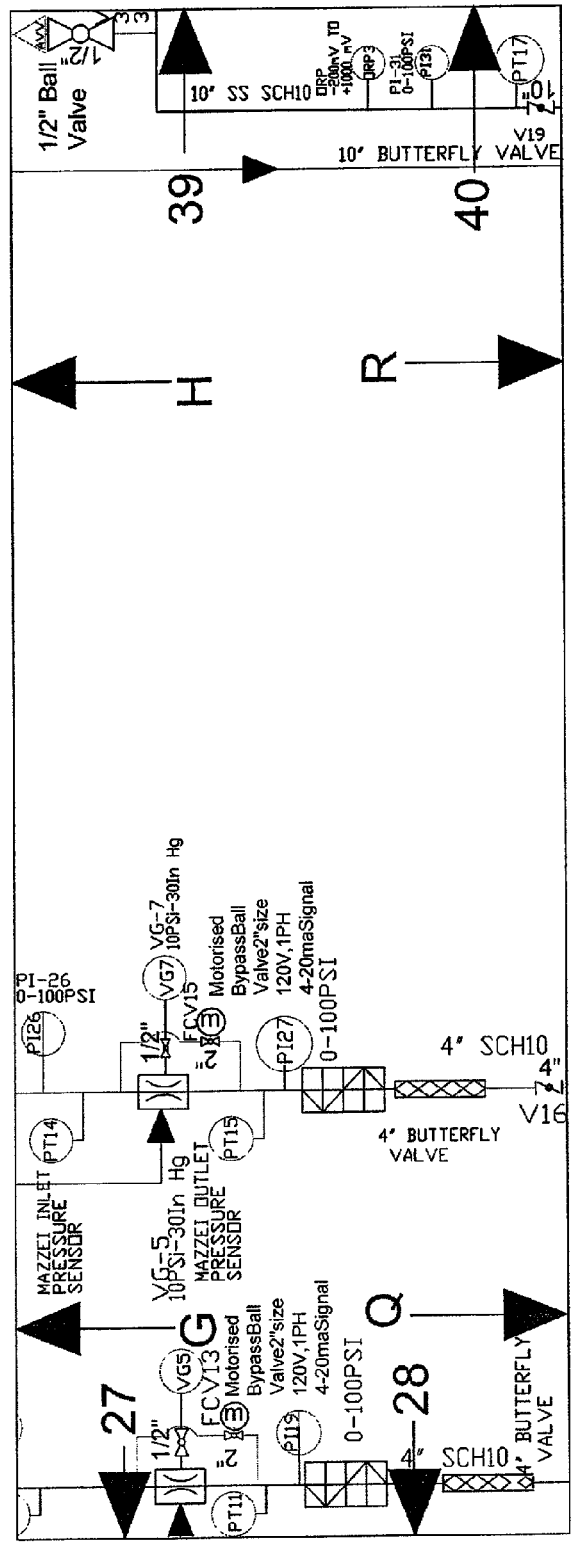
Figure 17J:
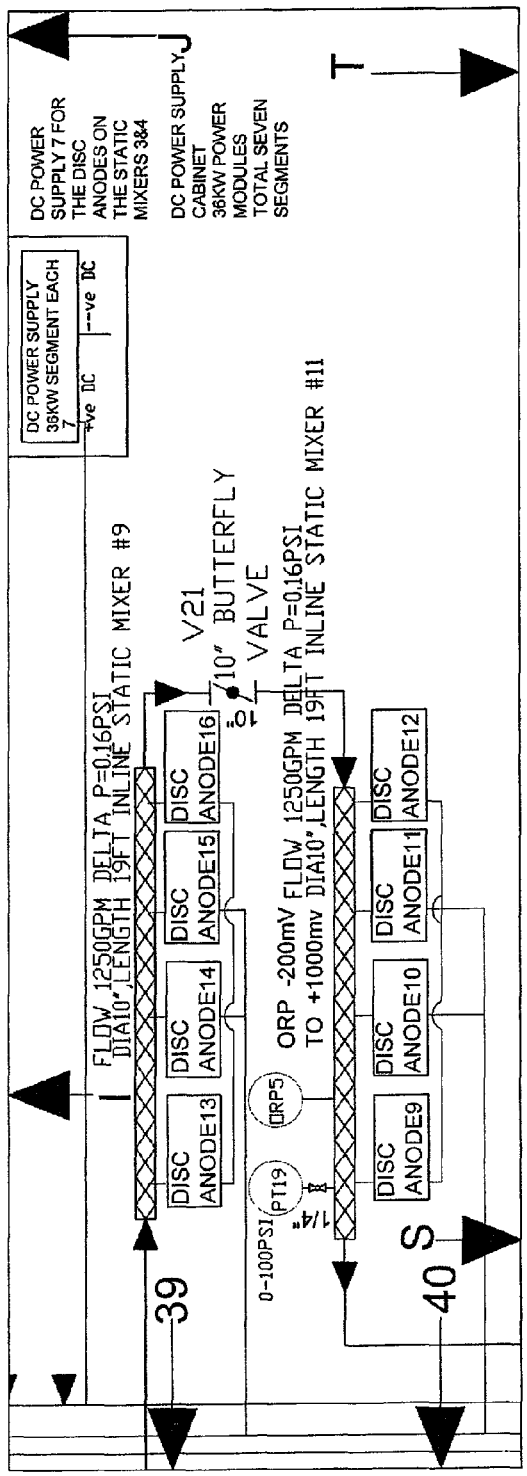
Figure 17K:
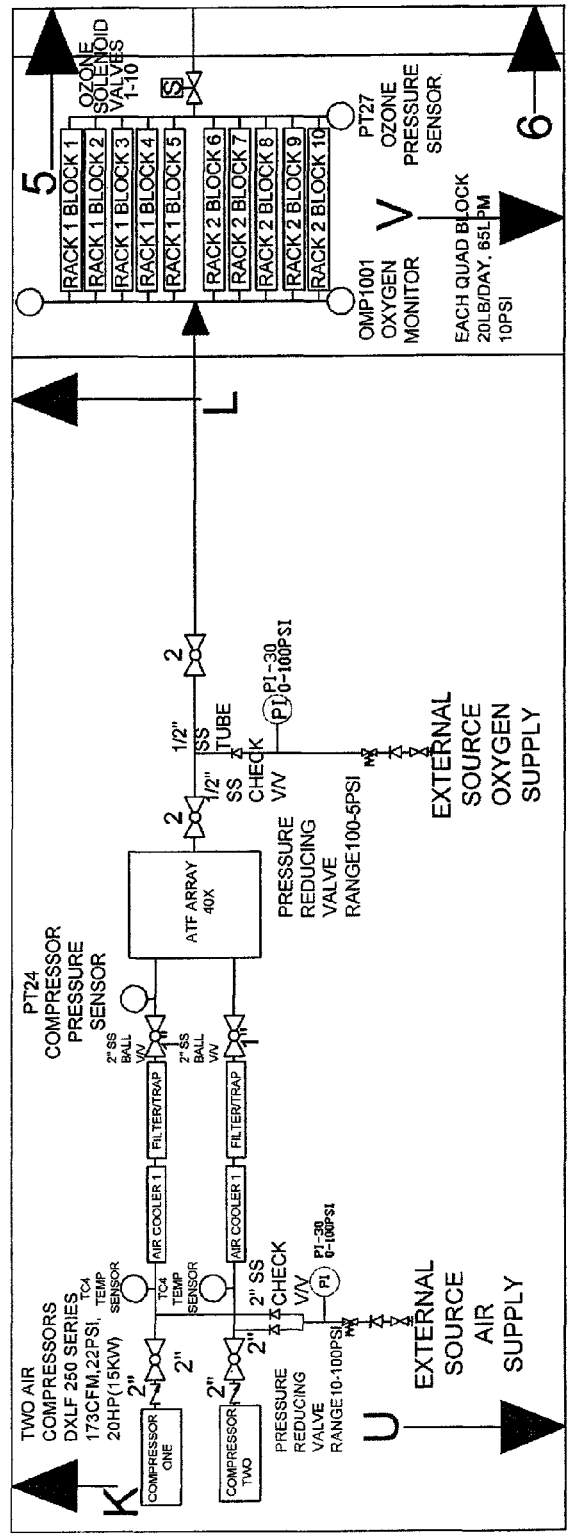
Figure 17L:
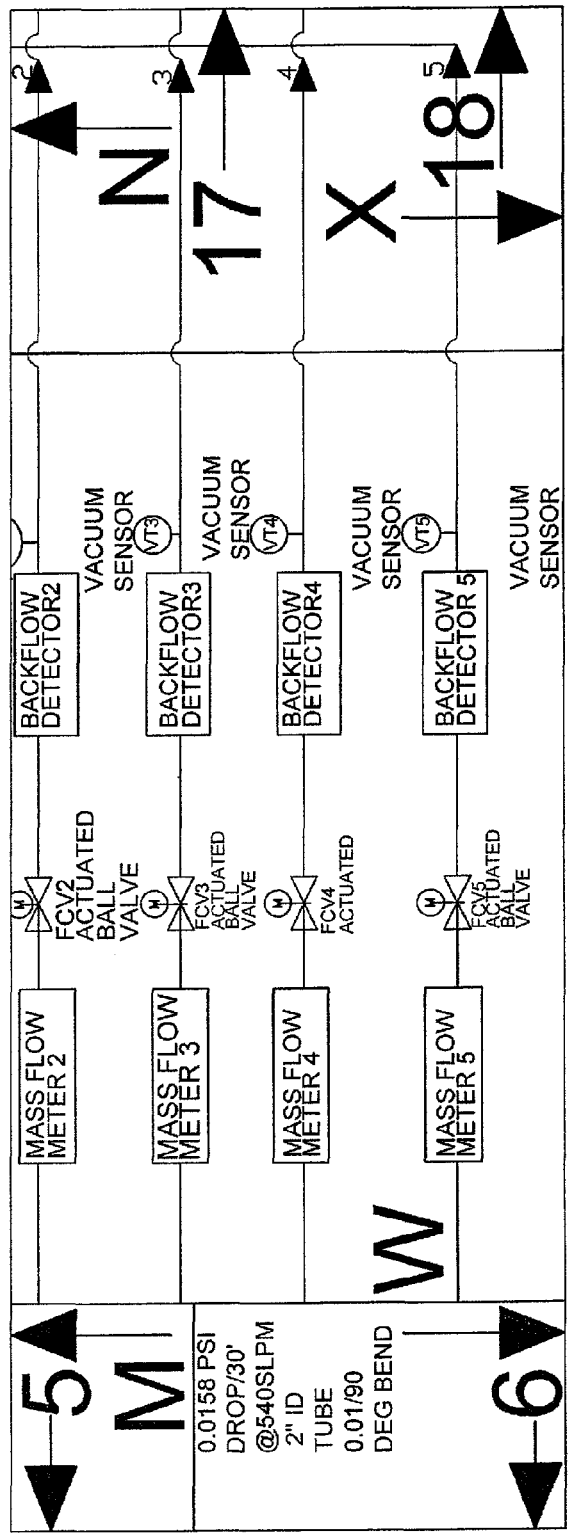
Figure 17M:
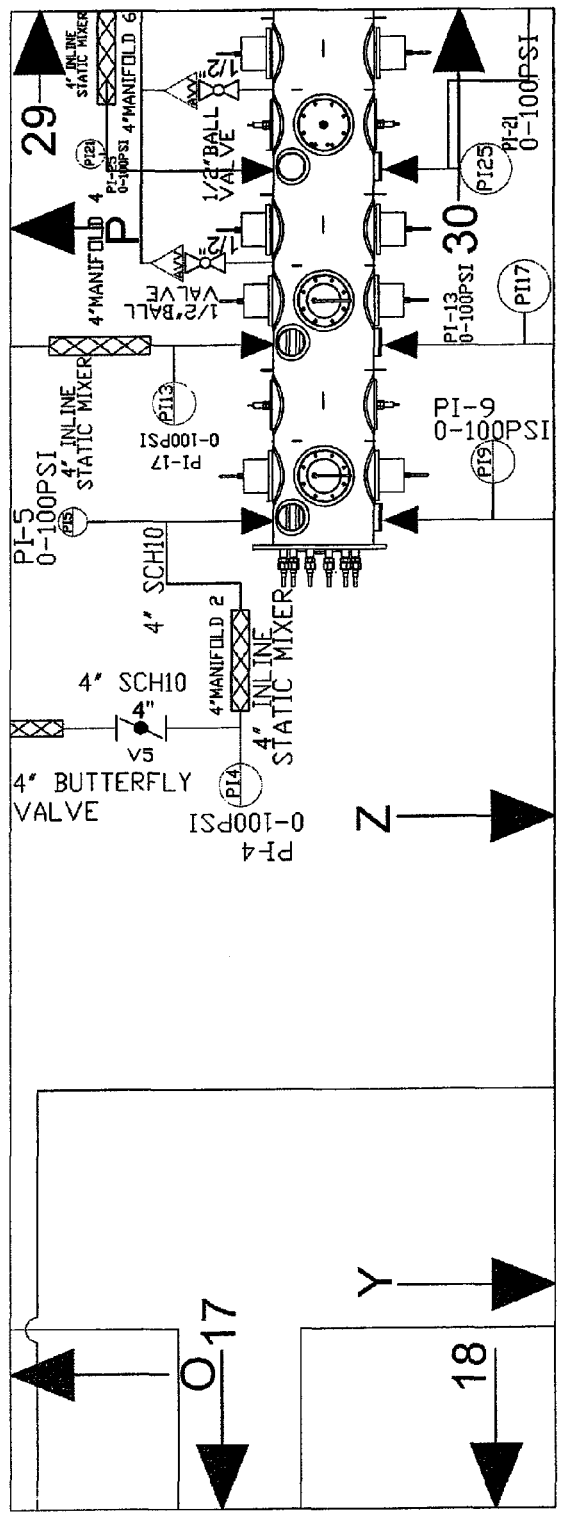
Figure 17N:
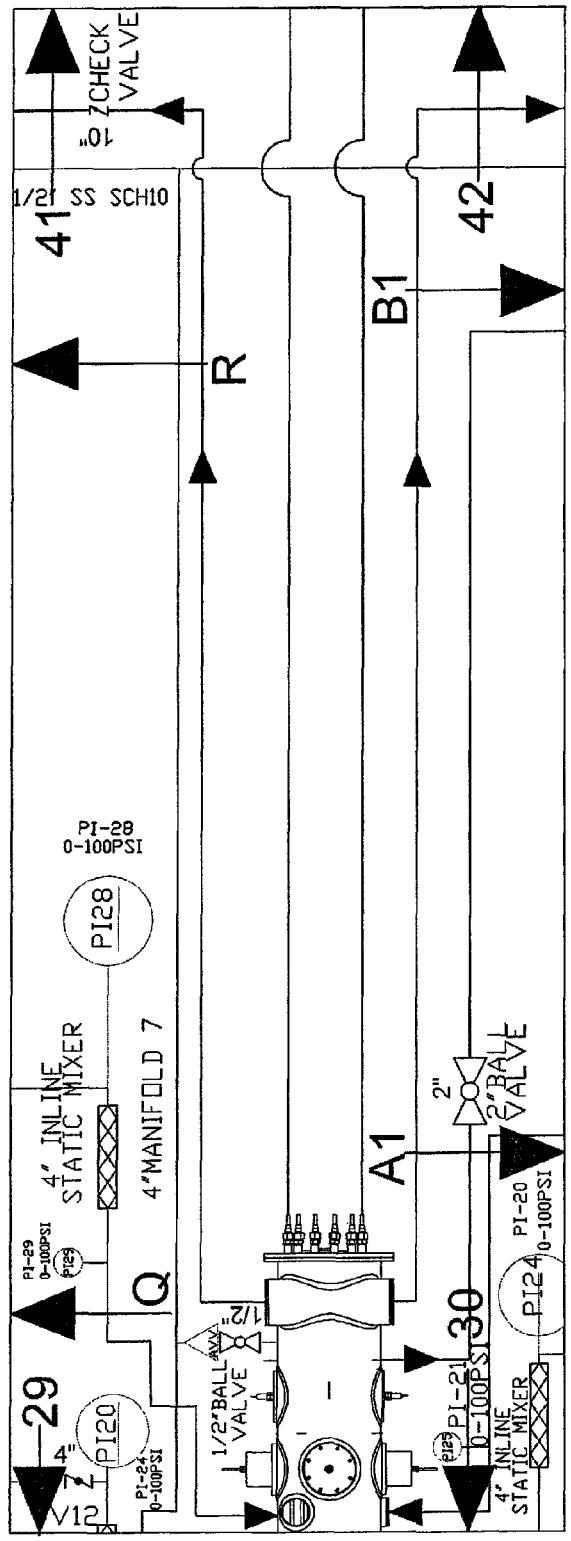
Figure 17O:
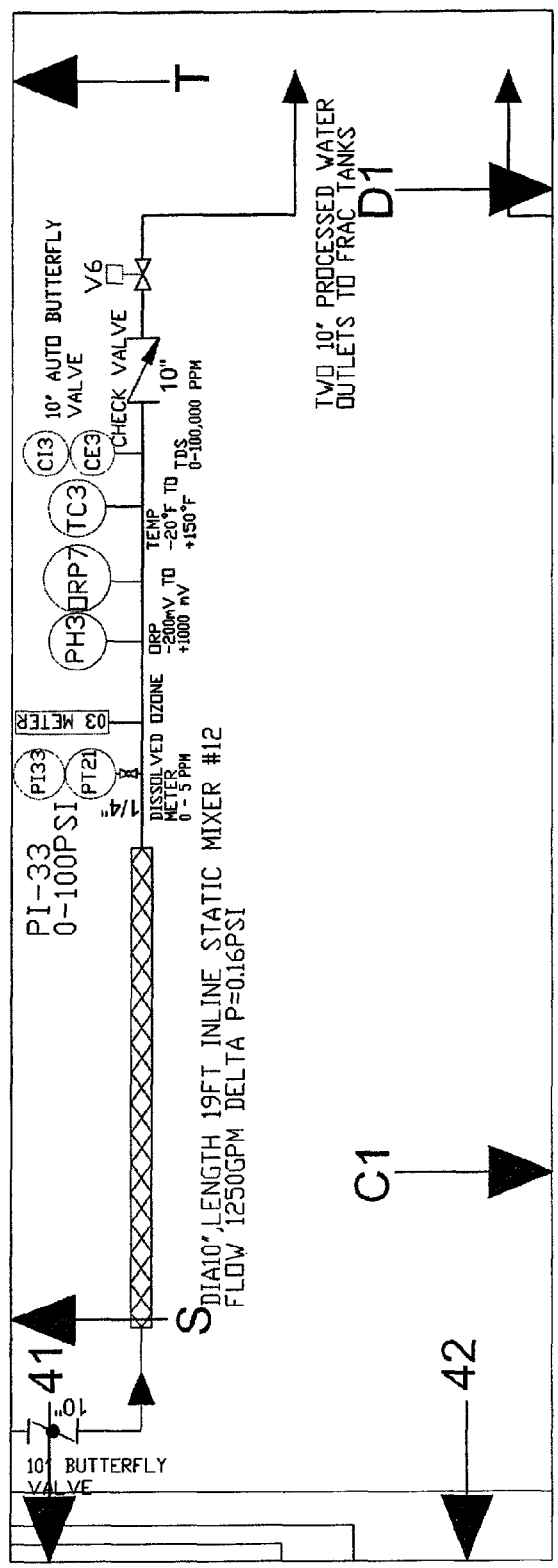
Figure 17P:
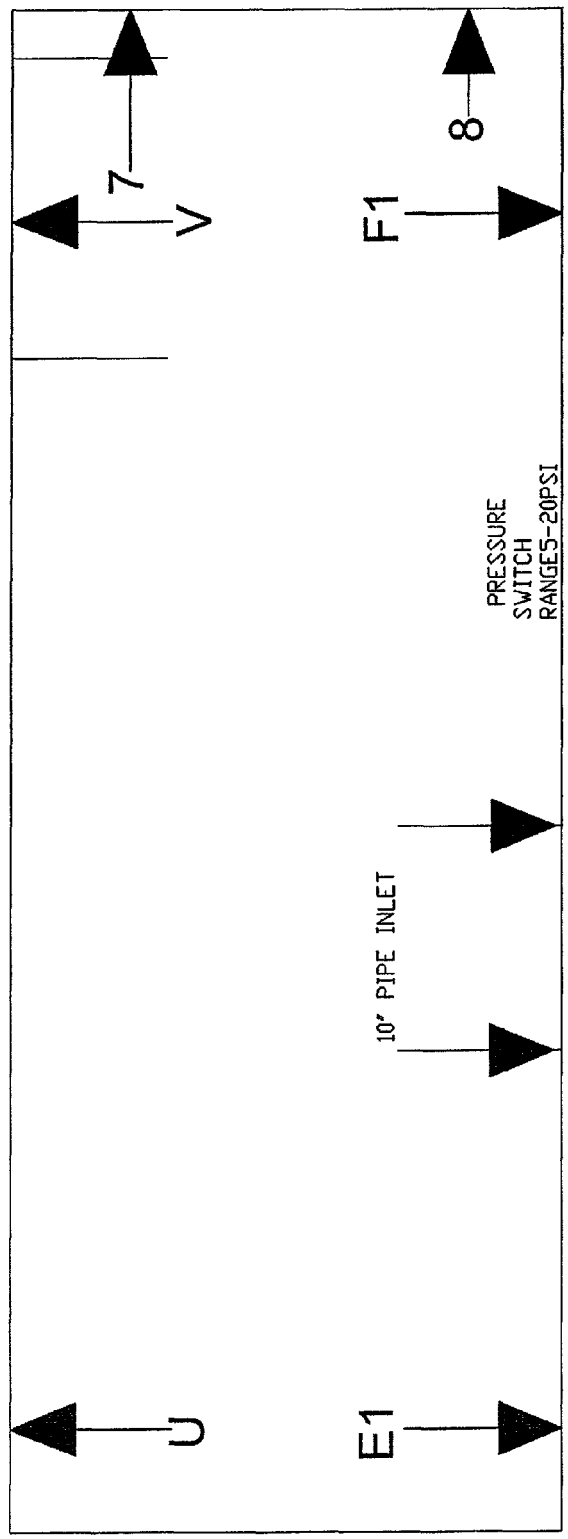
Figure 17Q:
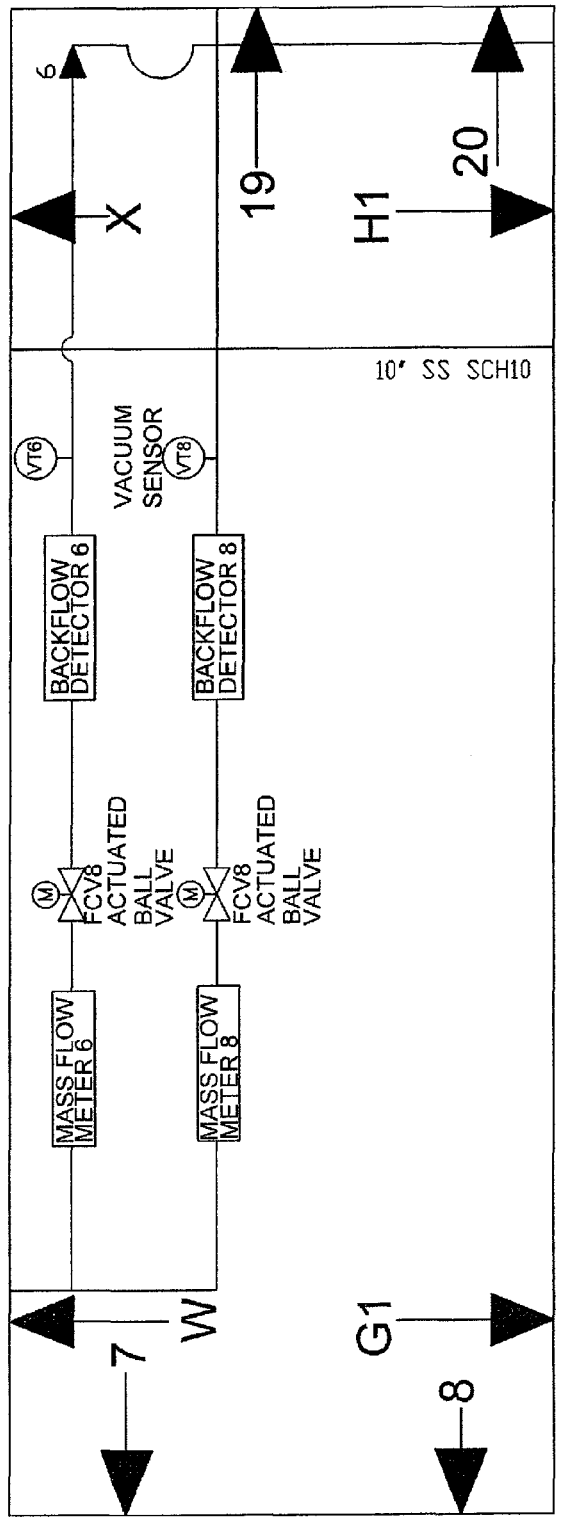
Figure 17R:
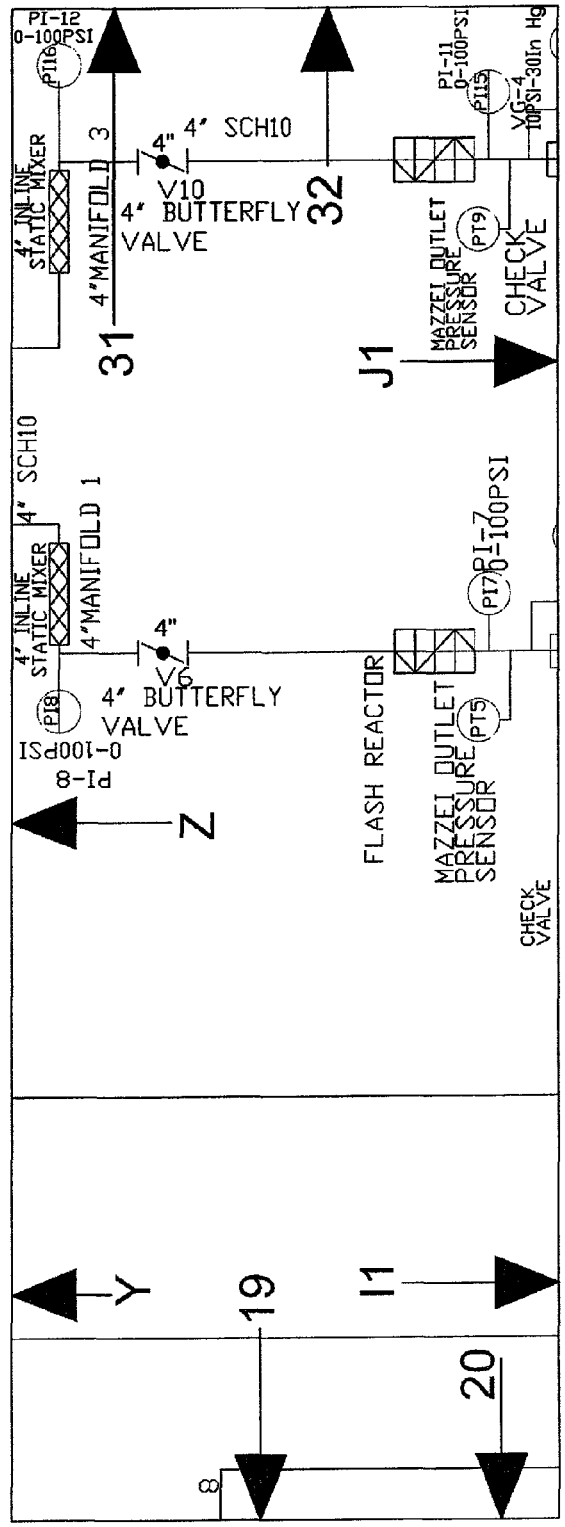
Figure 17S:
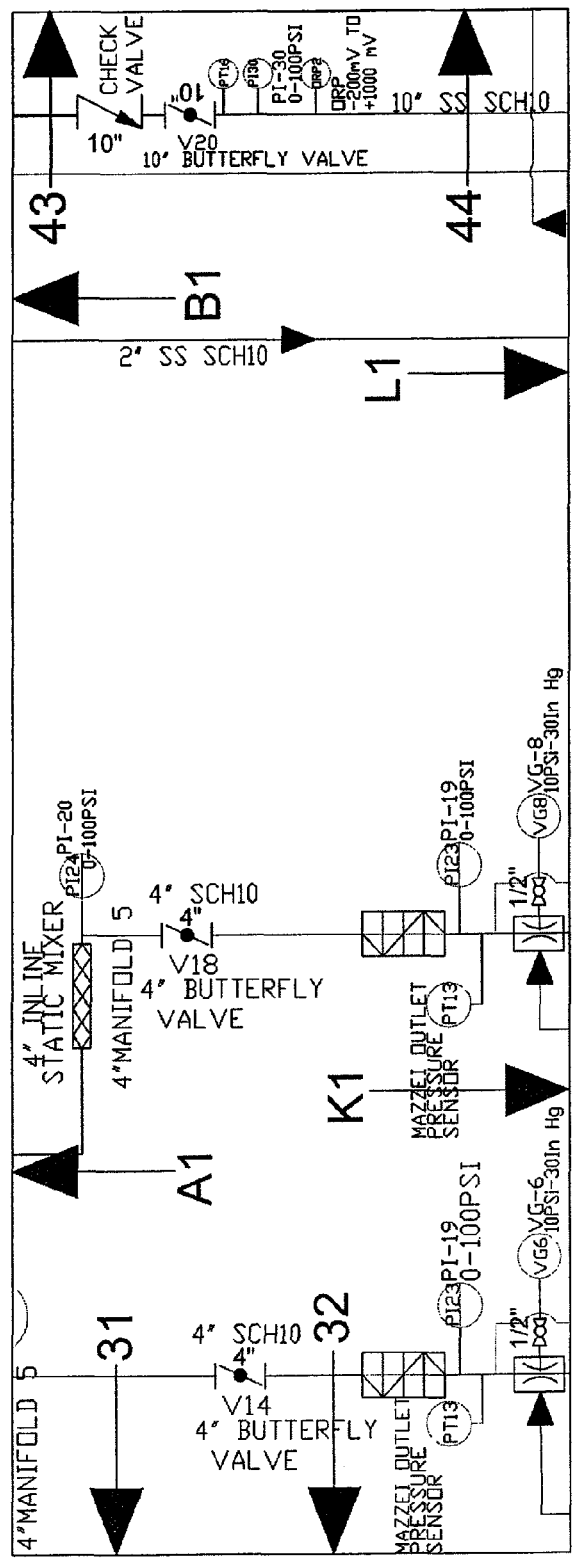
Figure 17T:
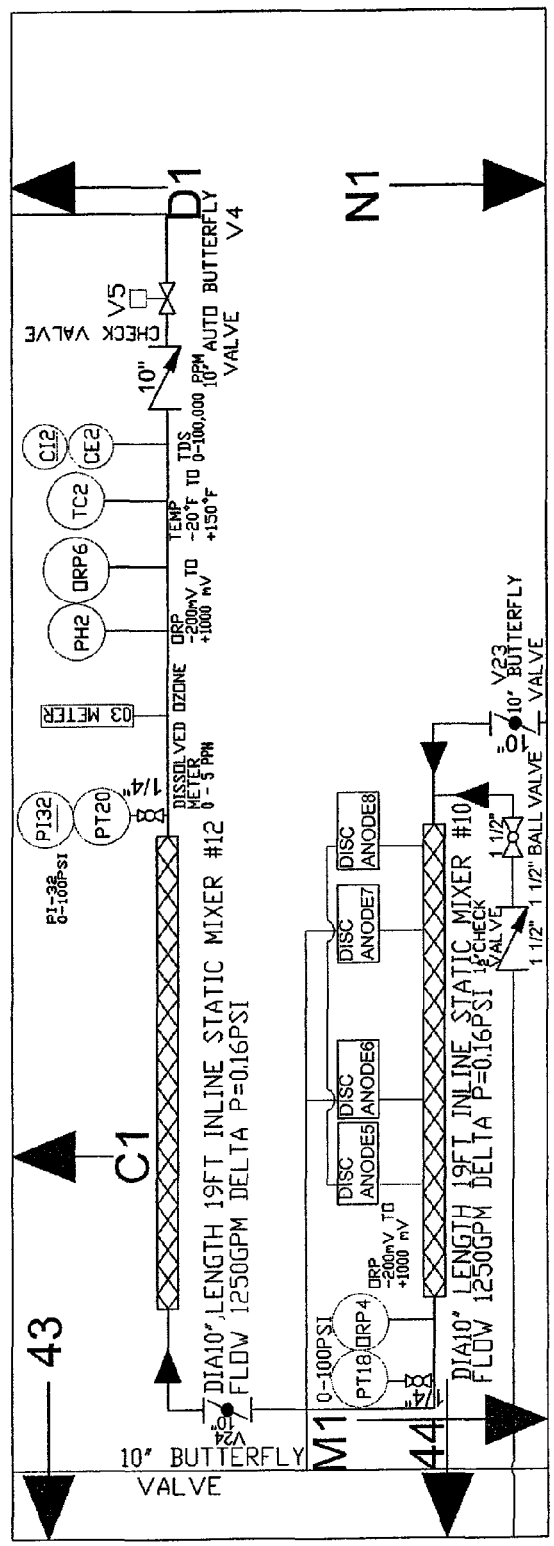
Figure 17U:
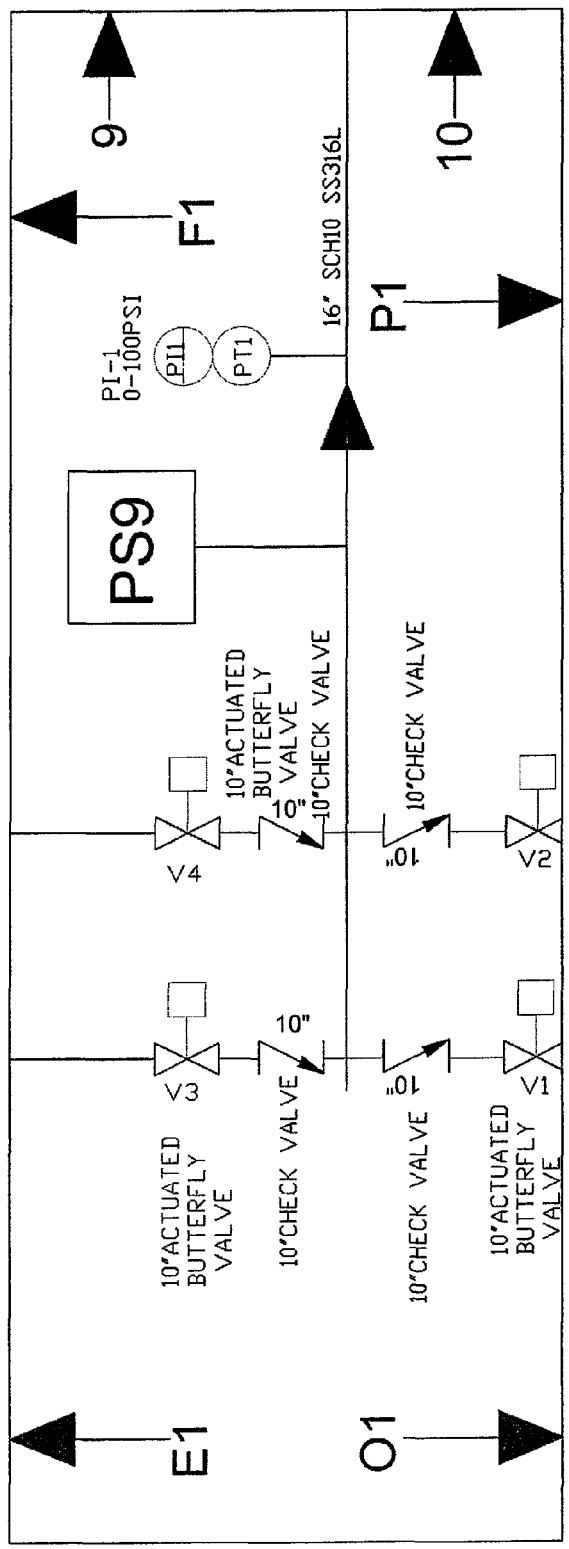
Figure 17V:
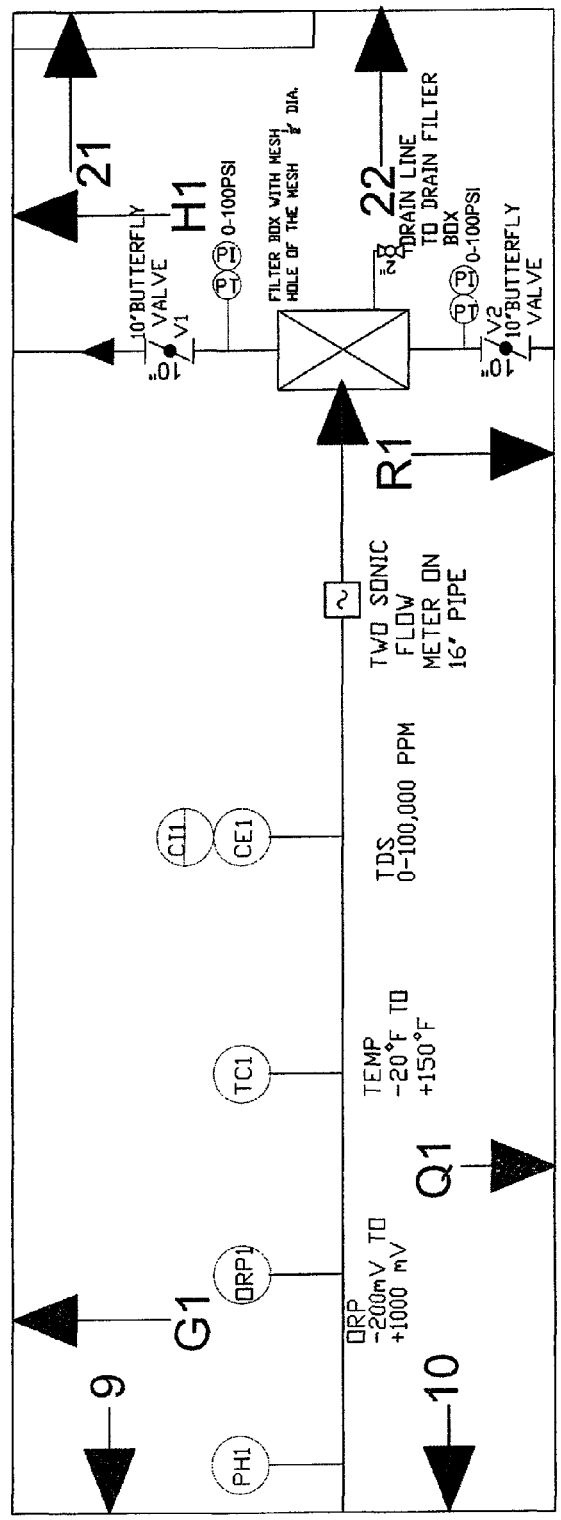
Figure 17W:
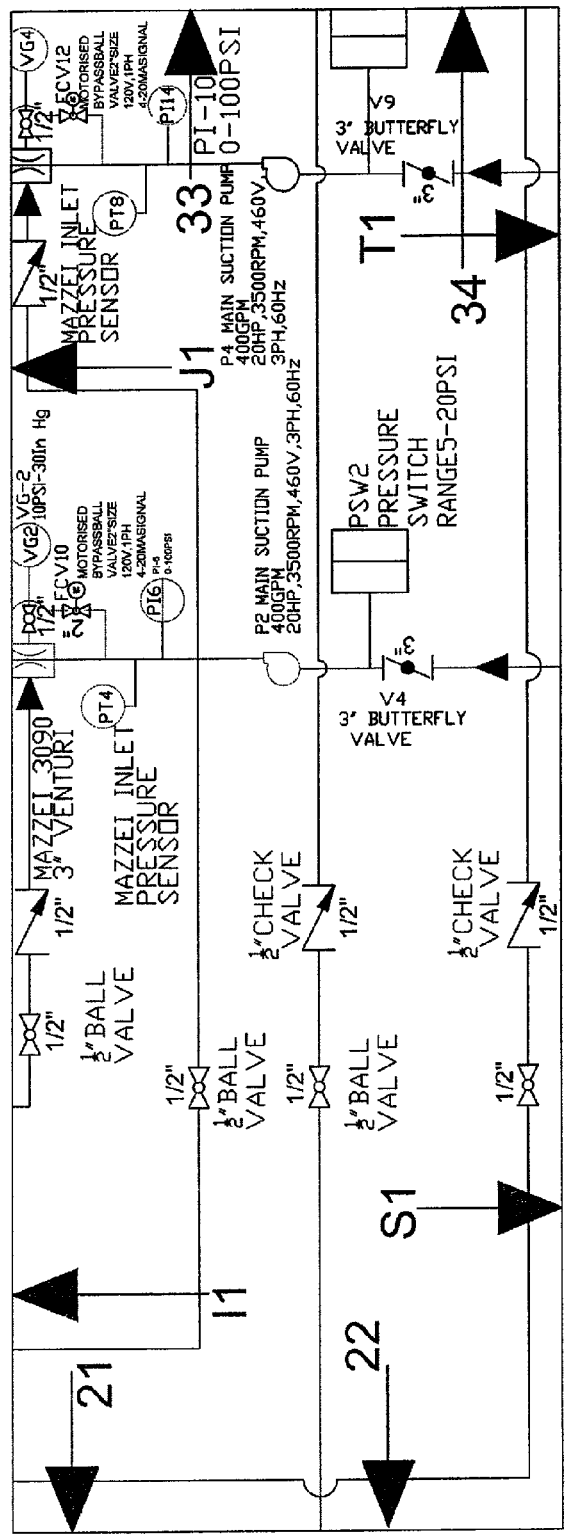
Figure 17X:
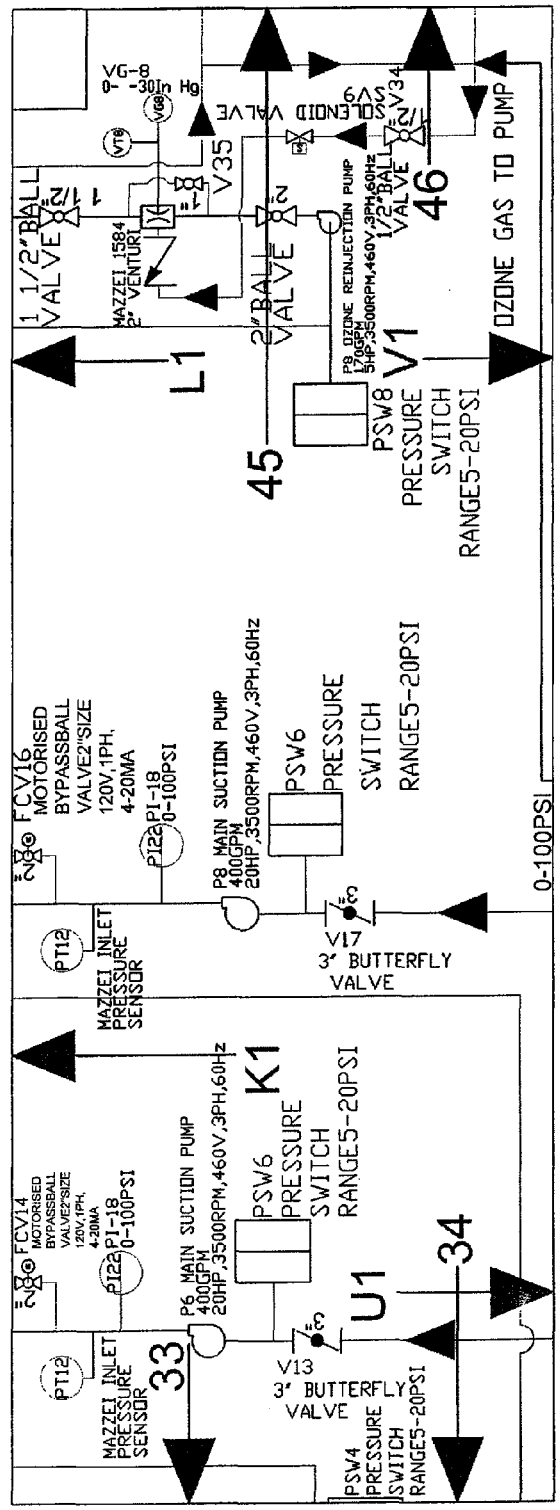
Figure 17Y:
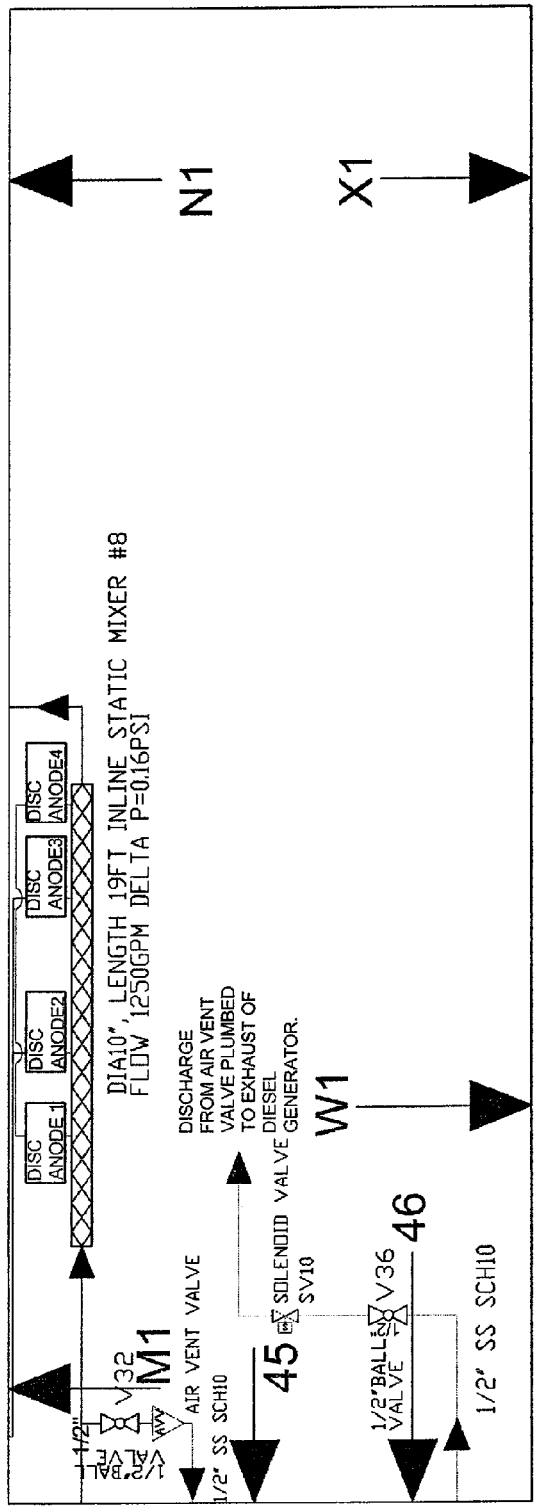
Figure 17Z:
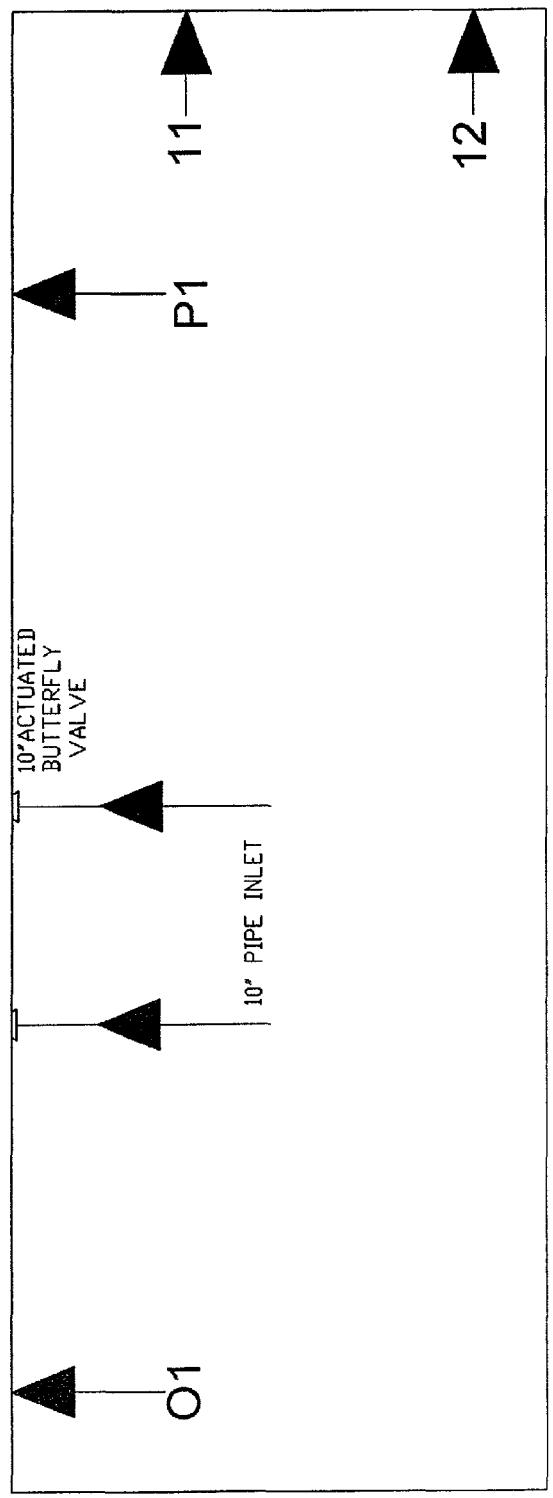
Figure 17A:
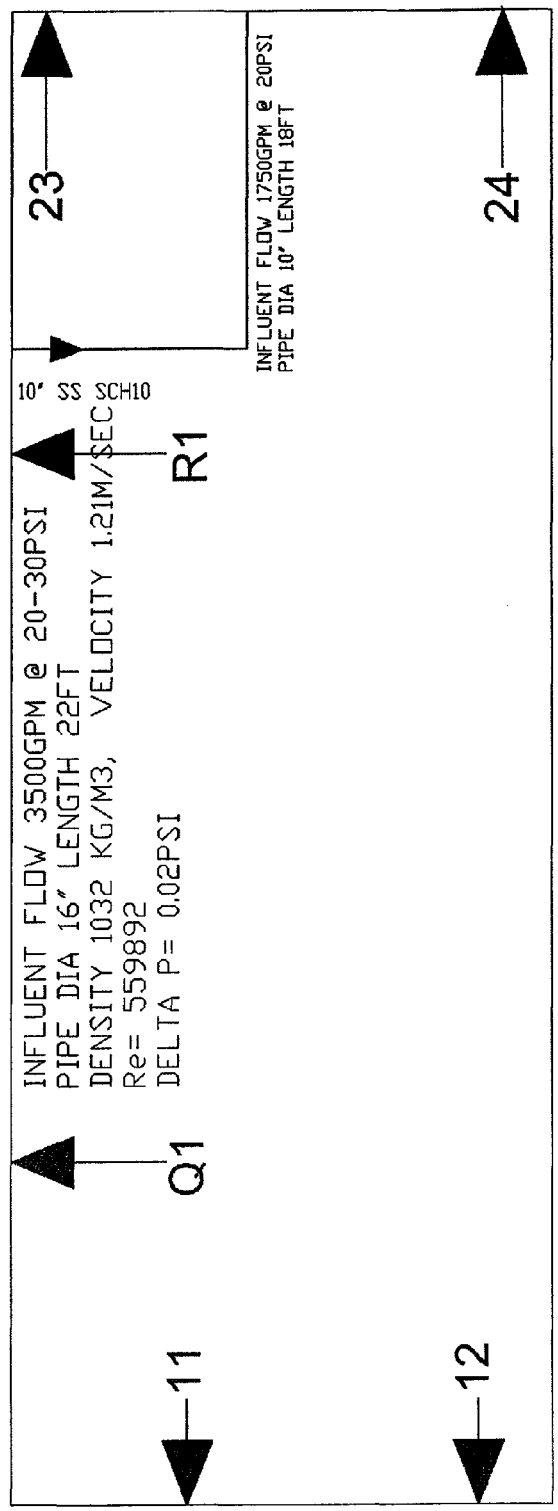
Figure 17B:
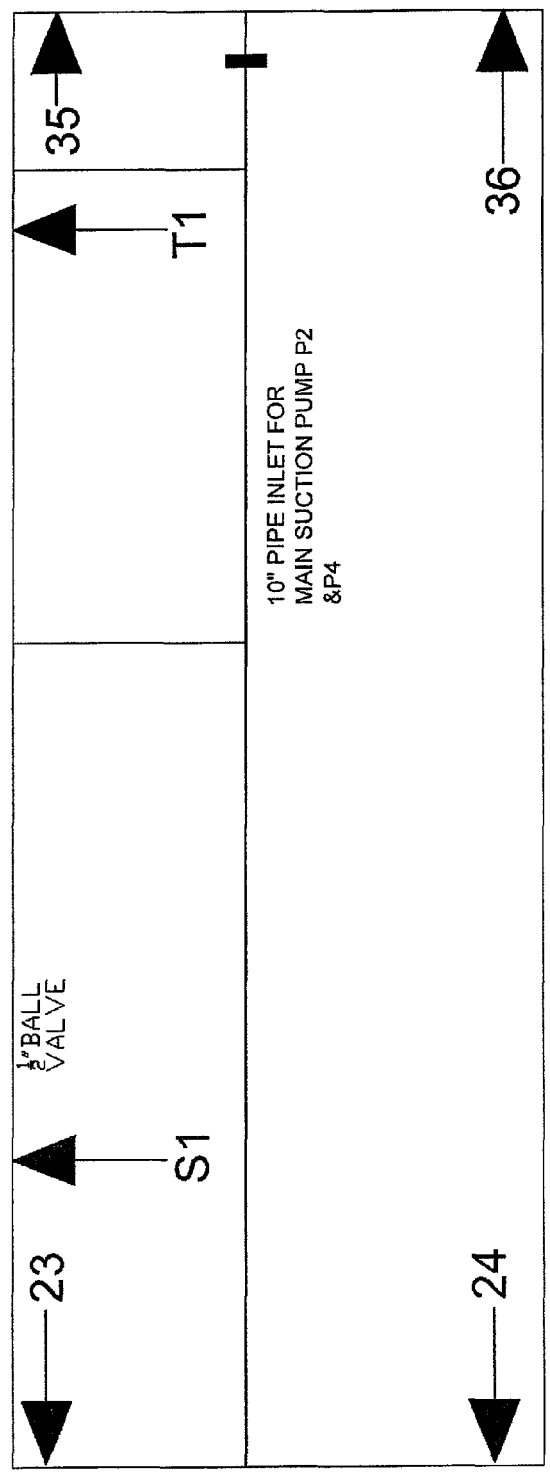
Figure 17C:
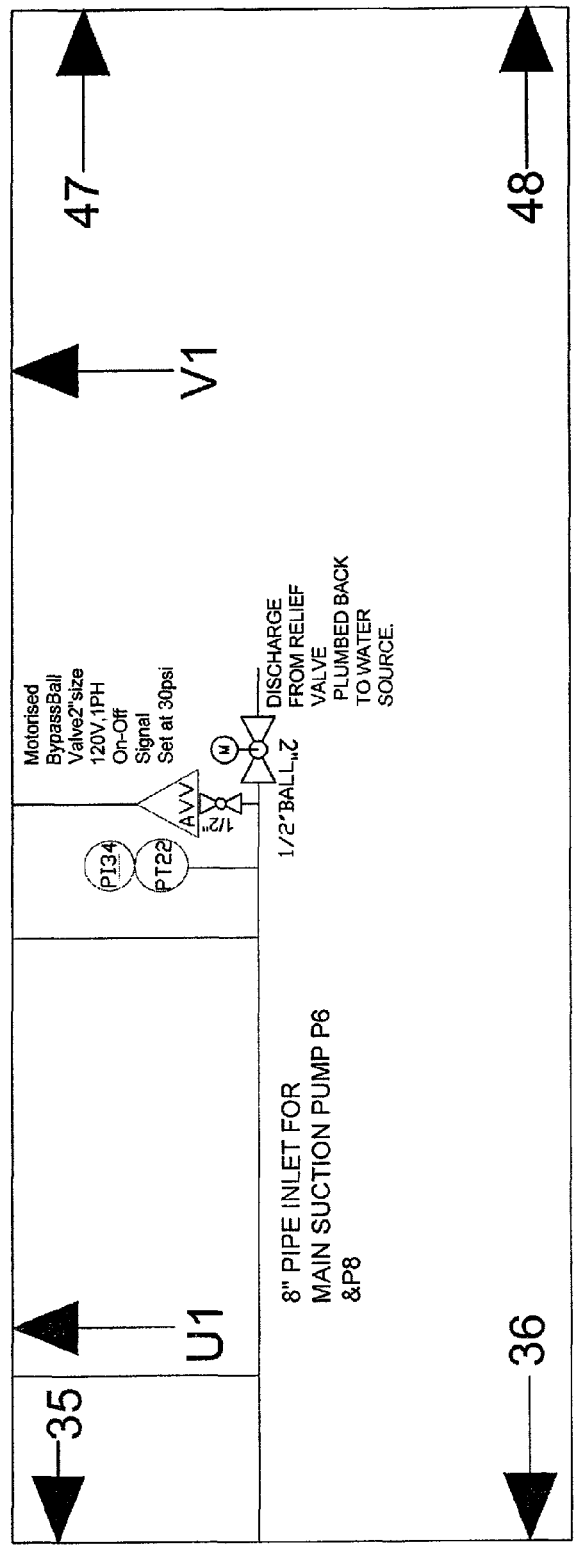
Figure 17D:
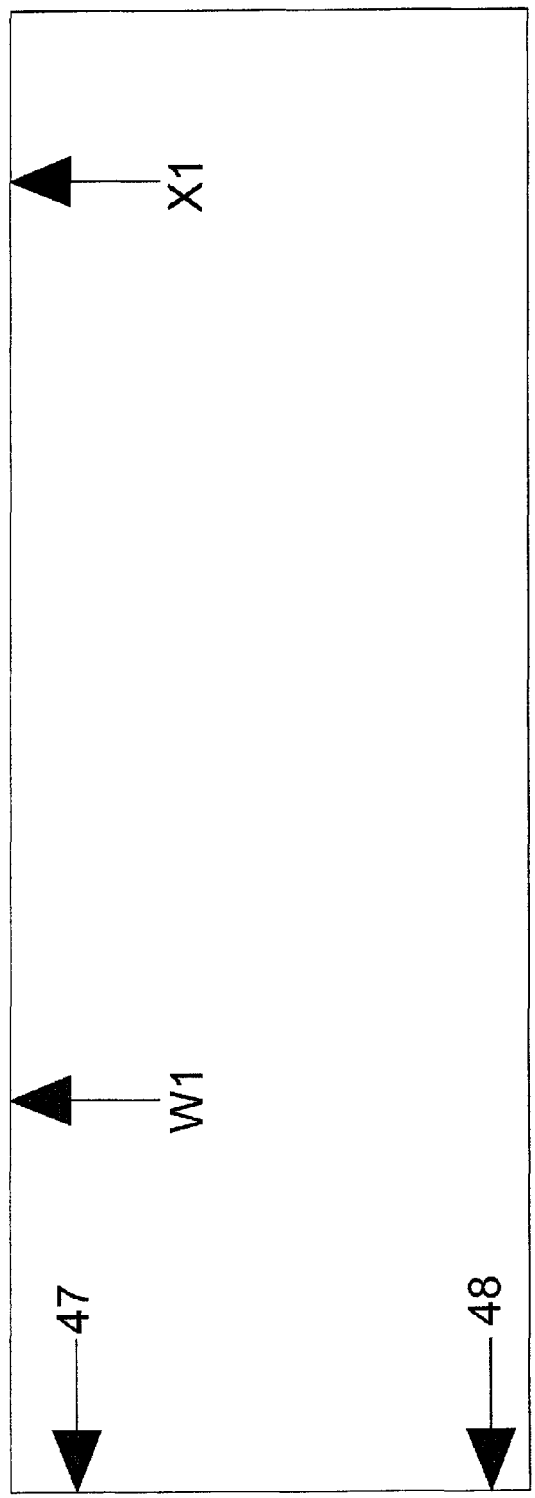

FIG. 16 is a complete P&ID (piping and instrument diagram) of the treatment system annotated with partition lines for FIGS. 17A through 17DD which are enlarged views to provide clarity. FIGS. 17A, 17B, 17C, 17D, 17E, 17F 17G, 17H, 17I, 17J, 17K, 17L, 17M, 17N, 17O, 17P, 17Q, 17R, 17S, 17T, 17U, 17V, 17W, 17X, 17Y, 17Z, 17AA, 17BB, 17CC, 17BB, 17CC and 17DD are enlarged views of various sections of the treatment as partitioned in FIG. 16.

The theory of operation behind the main treatment is as follows. The mass transfer of ozone in the water is achieved by hydrodynamic and acoustic cavitations. In the pressurized reactor tank 1, water that has been ozonated is introduced into through seven separate discharge nozzles 80. Initially the water to be treated is pressurized by six of the seven pumps each of which in turn feeds an ozone injector 72. The ozonated fluid is then introduced into a flash reactor 76 that is used to reduce the size of the ozone bubbles to enhance the gas mass transfer efficiency. The ozonated fluid is then introduced into a hydrodynamic mixing manifold 78. The discharge nozzles 80 direct the flow against the inner wall of cylindrical housing 3 of the main reactor 1. The phenomenon of hydrodynamic cavitations is created as the pressurized water leaves the small orifices within the hydrodynamic mixing manifold 78. The dissolved ozone forms into millions of micro bubbles that are mixed and reacted with the incoming water. As the water flows through the main reactor 1 the ultrasonic transducers located around the periphery of the main reactor emit ultrasonic waves in the range of 16 KHz and 20 KHz into the flow of water. The main reactor 1 also includes a plurality of disc anodes, 10 in number by way of example, located about the circumference of the main reactor 1. In addition, there are two groups of anode electrodes 10A and 10B that extend longitudinally into the main reactor 1 from the end plates 5 of the main reactor. Each group of the anode electrodes 10A and 10B consists of twelve rods approximately seven feet in length. The main reactor 1 also includes a pair of cylindrical cathode screens 12A and 12B that likewise extend longitudinally into the main reactor 1 from the end plates 5 to electro chemically treat the fluid with the main reactor.

A sonoluminescence effect is observed due to acoustic cavitation as these ultrasonic waves propagate in the water and catch the micro bubbles in the valley of the wave. Sonoluminescence occurs whenever a sound wave of sufficient intensity induces a gaseous cavity within a liquid to quickly collapse. This cavity may take the form of a pre-existing bubble, or may be generated through hydrodynamic and acoustic cavitation. Sonoluminescence can be made to be stable, so that a single bubble will expand and collapse over and over again in a periodic fashion, emitting a burst of light each time it collapses. The frequencies of resonance depend on the shape and size of the container in which the bubble is contained. The light flashes from the bubbles are extremely short, between 35 and few hundred picoseconds long, with peak intensities of the order of 1-10 mW. The bubbles are very small when they emit light, about 1 micrometer in diameter depending on the ambient fluid, such as water, and the gas content of the bubble. Single bubble sonoluminescence pulses can have very stable periods and positions. In fact, the frequency of light flashes can be more stable than the rated frequency stability of the oscillator making the sound waves driving them. However, the stability analysis of the bubble shows that the bubble itself undergoes significant geometric instabilities, due to, for example, the Bjerknes forces and the Rayleigh-Taylor instabilities. The wavelength of emitted light is very short; the spectrum can reach into the ultraviolet. Light of shorter wavelength has higher energy, and the measured spectrum of emitted light seems to indicate a temperature in the bubble of at least 20,000 Kelvin, up to a possible temperature in excess of one mega Kelvin. The veracity of these estimates is hindered by the fact that water, for example, absorbs nearly all wavelengths below 200 nm. This has led to differing estimates on the temperature in the bubble, since they are extrapolated from the emission spectra taken during collapse, or estimated using a modified Rayleigh-Plesset equation. During bubble collapse, the inertia of the surrounding water causes high speed and high pressure, reaching around 10,000 K in the interior of the bubble, causing ionization of a small fraction of the noble gas present. The amount ionized is small enough fir the bubble to remain transparent, allowing volume emission; surface emission would produce more intense light of longer duration, dependent on wavelength, contradicting experimental results. Electrons from ionized atoms interact mainly with neutral atoms causing thermal bremsstrahlung radiation. As the ultrasonic waves hit a low energy trough, the pressure drops, allowing electrons to recombine with atoms, and light emission to cease due to this lack of free electrons. This makes for a 160 picosecond light pulse for argon, as even a small drop in temperature causes a large drop in ionization, due to the large ionization energy relative to the photon energy.

It is to be understood that while certain forms of the invention is illustrated, it is not to be limited to the specific form or process herein described and shown. It will be apparent to those skilled in the art that various changes may be made without departing from the scope of the invention and the invention is not to be considered limited to what is shown and described in the specification and drawings.

What is claimed is:

1. A process for treating fluid comprising, flowback water, produced fluids or petroleum industry wastewater including the steps of:
    pressurizing a source of fluid with at least one pump discharging into at least one ozone injection apparatus and thereafter injecting about 505 grams/hour of ozone into said fluid flowing through said at least one ozone injection apparatus to form an ozonated fluid;
    passing said fluid with injected ozone through a flash reactor having flow paths that create areas of severe velocity and pressure changes which reduces the size of the ozone bubbles to nano size;
    directing the fluid leaving the flash reactor to a hydrodynamic mixing manifold to create hydrodynamic cavitation;
    directing said fluid from said hydrodynamic mixing manifold into at least one inlet passageway having a converging dynamic nozzle at an outlet of said at least one inlet passageway and into a main reactor; said reactor having a plurality of ultrasonic transducers, a plurality of anodes and a plurality of cathodes;
    energizing said plurality of ultrasonic transducers within said main reactor to generate acoustic cavitation within said ozonated fluid;
    energizing said plurality of anodes and cathodes within said main reactor to create an electrical potential within said main reactor to facilitate precipitation of crystals;
    conveying the fluid exiting the main reactor through an outlet segment to at least one outlet line;
    whereby scale formation within the fluid is reduced, bacteria within the fluid is destroyed, and heavy metals within the fluid are oxidized.

2. The process for treating a fluid as set forth in claim 1 further including the steps of:
    energizing a plurality of anodes within said at least one outlet line thereby creating an electrical potential within said at least one outlet line.

3. The process for treating a fluid as set forth in claim 1 further including the steps of:
    creating hydrodynamic cavitation within at least a portion of said at least one outlet line.

4. The process for treating a fluid as set forth in claim 1 further including the steps of:
    directing said ozonated fluid into a plurality of inlet passageways of said main reactor.

5. The process for treating a fluid as set forth in claim 1 wherein the converging dynamic nozzle of said at least one inlet passageway directs the fluid to impact against an interior wall of said main reactor.

6. The process for treating a fluid as set forth in claim 1 wherein said main reactor includes a cylindrical housing, said main reactor including a plurality of said at least one inlet passageways, each of said plurality of inlet passageways including a dynamic converging nozzle that directs the fluid to impact an interior wall of said main reactor.

7. The process for treating a fluid as set forth in claim 1, further including the step of electrically heating a plate adjacent each one of said plurality of ultrasonic transducers.

8. The process for treating a fluid as set forth in claim 1, further including the step of mounting said plurality of anodes on a cylindrical surface removably attached to said main reactor.

9. The process for treating a fluid as set forth in claim 1, further including the step of mounting said plurality of anodes on a pair of circular end plates of said main reactor.

10. The process for treating fluid as set forth in claim 1, further including the step of directing oxygen through an ozone generator, said oxygen being concentrated from the air using an oxygen generator.

11. The process for treating a fluid as set forth in claim 10, further including the step of injecting said ozone through an injection port formed in a venturi section of the fluid flow path.

12. The process for treating a fluid as set forth in claim 1, further including the step of mounting said main reactor on a skid to facilitate installation, maintenance, repair, replacement and transport of said main reactor.

13. The process for treating a fluid as set forth in claim 12, further including the step of mounting said skid on a truck trailer.

14. The process for treating a fluid as set forth in claim 13, further including the step of mounting an ozone generator on said truck trailer.

15. The process for treating a fluid as set forth in claim 13, further including the step of mounting an ultrasonic generator on said truck trailer.

16. The process for treating a fluid as set forth in claim 13, further including the step of mounting a DC power supply source on said truck trailer.

17. The process for treating a fluid as set forth in claim 13, further including the step of mounting diesel powered generator on said truck trailer.

18. The process for treating a fluid as set forth in claim 1 including the step of creating a pressure greater than atmospheric pressure within said main reactor.

19. The process for treating a fluid as set forth in claim 1 including the step of electro chemically treating the fluid in said at least one outlet line.

20. The process for treating a fluid as set forth in claim 19 including the step of creating hydrodynamic cavitation within the fluid in said at least one outlet line.

21. The process for treating a fluid as set forth in claim 1, further including the step of mounting a cylindrical cathode screen on each of a pair of circular end plates of said main reactor.

\* \* \* \* \*